US009919927B2

(12) United States Patent
Tour et al.

(10) Patent No.: US 9,919,927 B2
(45) Date of Patent: Mar. 20, 2018

(54) METHODS OF PRODUCING GRAPHENE QUANTUM DOTS FROM COAL AND COKE

(71) Applicant: William Marsh Rice University, Houston, TX (US)

(72) Inventors: James M. Tour, Bellaire, TX (US); Ruquan Ye, Houston, TX (US); Changsheng Xiang, Houston, TX (US); Jian Lin, Houston, TX (US); Zhiwei Peng, Houston, TX (US); Gabriel Ceriotti, Montevideo (UY)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 0 days.

(21) Appl. No.: 14/888,301

(22) PCT Filed: May 2, 2014

(86) PCT No.: PCT/US2014/036604
§ 371 (c)(1),
(2) Date: Oct. 30, 2015

(87) PCT Pub. No.: WO2014/179708
PCT Pub. Date: Nov. 6, 2014

(65) Prior Publication Data
US 2016/0060122 A1 Mar. 3, 2016

Related U.S. Application Data
(60) Provisional application No. 61/818,800, filed on May 2, 2013.

(51) Int. Cl.
*C01B 31/02* (2006.01)
*C01B 31/04* (2006.01)
(Continued)

(52) U.S. Cl.
CPC ........ *C01B 31/0446* (2013.01); *C01B 32/182* (2017.08); *C01B 32/184* (2017.08);
(Continued)

(58) Field of Classification Search
CPC ............ C01B 31/0446; C01B 31/0484; C01B 31/0438; C01B 2204/02; C01B 2204/04;
(Continued)

(56) References Cited

U.S. PATENT DOCUMENTS

2004/0223901 A1  11/2004  Smalley et al.
2006/0121279 A1*  6/2006  Petrik .................... B82Y 30/00
428/403

(Continued)

FOREIGN PATENT DOCUMENTS

CN    101973541 A    2/2011
CN    102336404 A    2/2012
(Continued)

OTHER PUBLICATIONS

Wu, Yingpeng, et al. "Efficient and Large Scale Synthesis of Graphene from Coal and Its Film Electrical Properties Studies." Journal of nanoscience and nanotechnology 13.2 (2013): 929-932.*
(Continued)

*Primary Examiner* — Richard M Rump
(74) *Attorney, Agent, or Firm* — Winstead PC

(57) ABSTRACT

In some embodiments, the present disclosure pertains to methods of making graphene quantum dots from a carbon source (e.g., coal, coke, and combinations thereof) by exposing the carbon source to an oxidant. In some embodiments, the methods of the present disclosure further comprise a step of separating the formed graphene quantum dots from the oxidant. In some embodiments, the methods of the present disclosure further comprise a step of reducing the formed graphene quantum dots. In some embodiments, the methods
(Continued)

of the present disclosure further comprise a step of enhancing a quantum yield of the graphene quantum dots. In further embodiments, the methods of the present disclosure also include a step of controlling the diameter of the formed graphene quantum dots by selecting the carbon source. In some embodiments, the formed graphene quantum dots comprise oxygen addends or amorphous carbon addends on their edges.

40 Claims, 22 Drawing Sheets

(51) Int. Cl.
| | |
|---|---|
| *C01B 32/182* | (2017.01) |
| *C01B 32/184* | (2017.01) |
| *C01B 32/192* | (2017.01) |
| *C01B 32/194* | (2017.01) |
| *B82Y 40/00* | (2011.01) |

(52) U.S. Cl.
CPC .......... *C01B 32/192* (2017.08); *C01B 32/194* (2017.08); *B82Y 40/00* (2013.01); *C01B 2204/02* (2013.01); *C01B 2204/04* (2013.01); *C01B 2204/32* (2013.01); *Y10S 977/774* (2013.01)

(58) Field of Classification Search
CPC .. C01B 2204/32; B82Y 40/00; Y10S 977/774
See application file for complete search history.

(56) References Cited

U.S. PATENT DOCUMENTS

| | | | |
|---|---|---|---|
| 2011/0186789 A1* | 8/2011 | Samulski ............... | B82Y 30/00 252/514 |
| 2011/0217721 A1 | 9/2011 | Allam et al. | |
| 2012/0068152 A1 | 3/2012 | Hwang et al. | |
| 2012/0201738 A1* | 8/2012 | Kwon ...................... | B01J 6/004 423/415.1 |
| 2012/0279570 A1 | 11/2012 | Li et al. | |
| 2013/0202866 A1 | 8/2013 | Lee | |
| 2015/0280248 A1 | 10/2015 | Tour et al. | |

FOREIGN PATENT DOCUMENTS

| | | | |
|---|---|---|---|
| CN | 101973541 B | | 9/2012 |
| CN | 102849724 A | * | 1/2013 |
| CN | 102849724 A | | 1/2013 |
| CN | 102336404 B | * | 4/2013 |
| CN | 102336404 B | | 4/2013 |
| WO | WO 2011/019095 A1 | | 2/2011 |
| WO | WO-2011019184 A2 | | 2/2011 |
| WO | WO-2014/037484 A1 | | 3/2014 |
| WO | WO-2014/064298 A1 | | 5/2014 |
| WO | WO-2016/025051 A2 | | 2/2016 |
| WO | WO-2016/053411 A1 | | 4/2016 |

OTHER PUBLICATIONS

Pan, Dengyu, et al. "Hydrothermal route for cutting graphene sheets into blue-luminescent graphene quantum dots." Advanced Materials 22.6 (2010): 734-738.*
Zhou, Quan, et al. "Graphene sheets from graphitized anthracite coal: preparation, decoration, and application." Energy & Fuels 26.8 (2012): 5186-5192.*
International Search Report and Written Opinion for PCT/US2014/036604, dated Sep. 2, 2014.
International Preliminary Report on Patentability for PCT/US2014/036604, dated Nov. 12, 2015.
Search Report and Written Opinion for Singapore Patent Application No. 11201509011S, dated Jun. 20, 2016.
International Search and Written Opinion for PCT/US2015/032209, dated Mar. 3, 2016.
International Search Report and Written Opinion for PCT/US2015/036729, dated Mar. 11, 2016.
Ye R. et al., Coal as an abundant source of graphene quantum dots. *Nature Communications*, Dec. 6, 2013, vol. 4, 2943.
Pan et al., "Hydrothermal route for cutting graphene sheets Into blue-luminescent graphene 20-24 quantum dots", Advanced Materials [online], Feb. 9, 2010 (Feb. 9, 2010) [Retrieved on Feb. 10, 2016], vol. 22, issue 6, pp. 734-738; Retrieved from internet: <DOI: 10.1002/adrna.200902825>.
Sasikala S.P. et al., High Yield Synthesis of Aspect Ratio Controlled Graphenic Materials from Anthracite Coal in Supercritical Fluids, ACS Nano, 2016, 10 (5), pp. 5293-5303.
Zheng, X. T., Ananthanarayanan, A., Luo, K. Q. and Chen, P. (2015), Glowing Graphene Quantum Dots and Carbon Dots: Properties, Syntheses, and Biological Applications. Small, 11: 1620-1636. doi:10.1002/smll.201402648.
Cho H. et al., Surface Engineering of Graphene Quantum Dots and Their Applications as Efficient Surfactants, ACS Applied Materials & Interfaces 2015 7 (16), 8615-8621.
Wissler et al., Graphite and carbon powders for electrochemical applications. J. Power Sources 156, 142-150 (2006).
Marcano et al., Improved synthesis of graphene oxide. ACS Nano 4, 4806-4814 (2010).
Hong et al. Aggregation-induced emission: phenomenon, mechanism and applications. Chem. Commun. 29, 4332-4353 (2009).
Li et al., Processable aqueous dispersions of graphene nanosheets. Nat. Nanotechnol. 3, 101-105(2008).
Zhu et al., Strongly green-photoluminescent graphene quantum dots for bioimaging applications, Chem. Comm.47, 6858-6860 (2011).
Loh et al., Graphene oxide as a chemically tunable platform for optical applications. Nature Chemistry 2, 1015-1024 (2010).
Tapasztó et al., Tailoring the atomic structure of graphene nanoribbons by scanning tunneling microscope lithography, Nature Nanotechnology 3, 397-401 (2008).
Liu et al., PEGylated nano-graphene oxide for delivery of water insoluble cancer drugs. J. Am. Chem. Soc.130, 10876-10877 (2008).
Guo et al., Layered graphene/quantum dots for photovoltaic devices. Angew. Che. Int. Ed.49, 3014-3017 (2010).
Cao et al., A facile one-step method to produce graphene-CdS quantum dot nanocompsites as promising optoelectronic materials. Adv. Mater. 22, 103-106 (2010).
Sternberg et al., Solubilization of coals by reductive alkylation. Fuel 53, 172-175 (1974).
Sun et al., Functionalization by reductive alkylation and mapping of a subbituminous coal by energy dispersive X-ray spectroscopy. Energy and Fuels 25, 1571-1577 (2011).
Lu et al., Transforming C60 molecules into graphene quantum dots. Nat. Nanotechnol.6, 247-252 (2011).
Li et al., Nitrogen-doped graphene quantum dots with oxygen-rich functional groups. J. Am. Chem. Soc 134, 15-18 (2012).
Shen et al., Facile preparation and upconversion luminescence of graphene quantum dots. Chem. Commun. 47, 2580-2582(2010).
Shinde et al., Electrochemical preparation of luminescent graphene quantum dots from multiwalled carbon nanotubes. Chem. Eur. J. 18, 12522-12528 (2012).
Peng et al., Graphene Quantum Dots Derived from Carbon Fibers. Nano Lett. 12, 844-849 (2012).
Hu et al., One-Step Preparation of Nitrogen-Doped Graphene Quantum Dots from Oxidized Debris of Graphene Oxide. J. Mater. Chem. B 2013, 1, 39.
Kwon et al., Electroluminescence from Graphene Quantum Dots Prepared by Amidative Cutting of Tattered Graphite. Nano Lett. 2014, 14, 1306.
Search Report for European Patent Application No. 14791674.6, dated Nov. 24, 2016.
Wu et al., Efficient and large scale synthesis of graphene from caol and its film electrical property studies, Journal of Nanoscience and Nanotechnology, vol. 13, No. 2, Jan. 2013, pp. 292-293.

(56) References Cited

OTHER PUBLICATIONS

Zhou et al., graphene sheets from graphitized anthracite coal: preparation, decoration, and application, Energy and Fuels, vol. 26, No. 8, Aug. 16, 2012, pp. 5186-5192.
Li et al., Synthesis of graphene nanosheets from petroleum asphalt by pulsed arc discharge in water, Chemical Engineering Journal, vol. 215-216, Nov. 10, 2012, pp. 45-49.
First Office Action for Chinese Application No. 201480036235.4, dated Oct. 28, 2016.

* cited by examiner

METHODS OF PRODUCING GRAPHENE QUANTUM DOTS FROM COAL AND COKE

CROSS-REFERENCE TO RELATED APPLICATIONS

This application claims priority to U.S. Provisional Patent Application No. 61/818,800, filed on May 2, 2013. The entirety of the aforementioned application is incorporated herein by reference.

STATEMENT REGARDING FEDERALLY SPONSORED RESEARCH

This invention was made with government support under Grant No. FA9550-09-1-0581, awarded by the U.S. Department of Defense; Grant No. FA9550-12-1-0035, awarded by the U.S. Department of Defense; and Grant No. N00014-09-1-1066, awarded by the U.S. Department of Defense. The government has certain rights in the invention.

BACKGROUND

Graphene quantum dots (GQDs) find applications in many fields. However, current methods of making graphene quantum dots suffer from various limitations, including quality, yield, and efficiency. The present disclosure addresses these limitations.

SUMMARY

In some embodiments, the present disclosure pertains to methods of making graphene quantum dots from a carbon source. In some embodiments, the carbon source is selected from the group consisting of coal, coke and combinations thereof. In some embodiments, the methods comprise exposing the carbon source to an oxidant. The exposing results in the formation of the graphene quantum dots.

In some embodiments, the carbon source includes at least one of coke, bituminous coal, anthracite, and combinations thereof. In some embodiments, the oxidant is a mixture of sulfuric acid and nitric acid.

In some embodiments, a carbon source is exposed to an oxidant by sonicating the carbon source in the presence of the oxidant. In some embodiments, the exposing comprises heating the carbon source in the presence of the oxidant.

In some embodiments, the methods of the present disclosure further comprise a step of separating the formed graphene quantum dots from the oxidant. In some embodiments, the separating occurs by neutralizing a solution comprising the formed graphene quantum dots, filtering the solution, and dialyzing the solution. In some embodiments, the separating occurs by cross-flow filtration, washing with a sodium hydroxide solution, hydrothermal treatment, and combinations of such steps.

In some embodiments, the methods of the present disclosure further comprise a step of reducing the formed graphene quantum dots. In some embodiments, the reducing comprises exposure of the formed graphene quantum dots to a reducing agent, such as hydrazine, sodium borohydride, heat, light, sulfur, sodium sulfide, sodium hydrogen sulfide, and combinations thereof.

In some embodiments, the methods of the present disclosure also comprise a step of enhancing the quantum yield of the graphene quantum dots. In some embodiments, the enhancing occurs by hydrothermal treatment of the graphene quantum dots, treatment of the graphene quantum dots with one or more bases (e.g., sodium hydroxide), treatment of the graphene quantum dots with one or more dopants (e.g., $NaH_3$, $NaHSe$, $NaH_2PO_3$), and combinations of such treatments.

In further embodiments, the methods of the present disclosure also include a step of controlling the diameter of the formed graphene quantum dots. In some embodiments, the controlling comprises selecting the carbon source. For instance, in some embodiments, the selected carbon source is bituminous coal, and the formed graphene quantum dots have diameters ranging from about 1 nm to about 5 nm. In some embodiments, the selected carbon source is anthracite, and the formed graphene quantum dots have diameters ranging from about 10 nm to about 50 nm. In some embodiments, the selected carbon source is coke, and the formed graphene quantum dots have diameters ranging from about 2 nm to about 10 nm.

In some embodiments, the formed graphene quantum dots have a crystalline hexagonal structure. In some embodiments, the formed graphene quantum dots have a single layer. In some embodiments, the formed graphene quantum dots have multiple layers, such as from about two layers to about four layers. In some embodiments, the formed graphene quantum dots are functionalized with a plurality of functional groups, such as amorphous carbons, oxygen groups, carbonyl groups, carboxyl groups, esters, amines, amides, and combinations thereof. In some embodiments, the formed graphene quantum dots comprise oxygen addends or amorphous carbon addends on their edges.

DESCRIPTION OF THE FIGURES

FIG. 2A provides macro-scale image and simplified illustrative nanostructures of bituminous coal. FIG. 2B provides a scanning electron microscopy (SEM) image of ground bituminous coal with sizes ranging from 1 micron to hundreds of microns in diameter. FIG. 2C provides a schematic illustration of the synthesis of b-GQDs. Oxygenated sites are shown in red. FIG. 2D provides a transmission electron microscopy (TEM) image of b-GQDs showing a regular size and shape distribution. FIG. 2E shows a high resolution TEM (HRTEM) image of representative b-GQDs from FIG. 2D. The inset is the two-dimensional fast Fourier transform (2D FFT) image that shows the crystalline hexagonal structure of these quantum dots. FIG. 2F is an atomic force microscopy (AFM) image of b-GQDs, showing heights between 1.5 nm to 3 nm.

FIG. 3A provides an SEM image of anthracite showing the irregular size and shape distribution ranging from 1 micron to hundreds of microns in diameter. The scale bar is 1 μm. FIG. 3B provides an SEM image of coke, showing normal spherical shapes with approximately 110 μm in diameter. The scale bar is 300 μm.

FIG. 4A provides x-ray photoelectron spectroscopy (XPS) survey of carbon sources. The analysis indicates that anthracite has more Al and Si content than bituminous coal and coke. FIG. 4B shows high resolution C1s XPS spectra of carbon sources where the 284.4 eV peak is assigned to C=C is double bond. FIG. 4C shows solid state Fourier transform infrared ray (ssFTIR) spectra of bituminous coal showing C—O, C=C, C=O, H-C$sp^3$ and O—H vibration modes at 1000, 1600, 1700, 2922 and 3360 cm$^{-1}$ as labeled, respectively. Weak C=C and C—O vibration modes for coke and anthracite are shown. FIG. 4D shows Raman spectra of carbon sources. D, G, 2D and 2G peaks are labeled at 1337, 1596, 2659 and 2913 cm$^{-1}$, respectively.

FIG. 5A shows the size distribution of b-GQDs at 2.96±0.96 nm. FIG. 5B shows a TEM image of a non-fully cut larger size b-GQD showing different nanometer-sized crystalline domains as highlighted by the circles. The inset is an FFT pattern that shows the crystalline hexagonal structure of the highlighted domains. The scale bar is 10 nm. FIG. 5C shows the AFM height profile of b-GQDs.

FIG. 6A provides a Raman spectrum of the b-GQDs. FIG. 6B provides a high resolution C1s XPS. A new peak corresponding to COOH appears at 288.3 eV. FIG. 6C provides an ssFTIR spectrum showing different vibration modes as labeled.

FIG. 7A shows the TEM image. The size is approximately 2 to 3 nm. A few outliers, which were not fully cut, have sizes larger than 4.5 nm. The scale bar is 10 nm. FIG. 7B shows the size distribution histogram of the b-GQDs.

FIG. 8B provides an SEM image of the treated graphite from FIG. 8A. The scale bar is 2 mm. FIG. 8C provides a high resolution SEM image of FIG. 8B. The scale bar is 100 µm. FIG. 8D provides a TEM image of GQDs synthesized by treating bituminous coal with KMna$_4$/H$_2$SO$_4$/H$_3$PO$_4$. The scale bar is 50 nm.

FIG. 9A provides a TEM image of c-GQDs showing the consistent round shape and size distribution of 5.8±1.7 nm. FIG. 9B provides a TEM image of a-GQDs showing stacking layer structures. FIG. 9C provides an HRTEM image of c-GQD. Insets are FFT patterns of the highlighted areas. FIG. 9D provides an HRTEM image of a-GQD. Insets are the FFT patterns of high and low layered structure. They both show crystalline hexagonal patterns.

FIG. 10A provides the size distribution of c-GQDs. FIG. 10B provides an AFM image of a-GQDs. The scale bar is 100 nm. FIG. 10C provides the height profile from FIG. 10B. FIG. 10D provides the size distribution of a-GQDs.

FIG. 11A provides Raman spectra showing that the 2D and 2G peaks disappeared due to the oxidation. FIG. 11B provides high resolution C1s XPS of c-GQDs and a-GQDs that show new shoulders at 288.3 eV corresponding to the carboxyl groups. FIG. 11C shows ssFTIR spectra of c-GQDs and a-GQDs showing C—O, C=O and O—H vibration modes.

FIG. 13A shows PL emission of GQDs excited at 345 nm. Inset is the photograph showing fluorescence of yellow (a-GQDs), green (c-GQDs) and blue (b-GQDs*). The concentration of these GQDs solutions was 80 mg/L and the pH was ~6. FIG. 13B shows the PL emission wavelength vs. the size of the GQDs, smaller GQDs lead to blue shift. FIG. 13C shows PL emission spectrum of b-GQDs excited at 345 nm from pH 3 to 10. The red arrow shows the red shift of emission with change of pH from 6 to 3 and the blue arrow shows the blue shift of emission from pH 7 to 10. FIG. 13D shows excitation and emission contour map of b-GQDs at pH 3 (top), pH 7 (middle) and pH 11 (bottom).

FIG. 14A provides UV absorptions of three types of GQDs, showing absorbance of 0.13 at 345 nm. FIG. 14B provides a Jablonski diagram obtained from FIG. 13C. A denotes absorption. GS is ground state. PL is photoluminescence. ES is excited state. IC is internal conversion. Nonag is non-aggregated state. Ag is the aggregated state. A, n, b signify acidic, neutral and basic, respectively. FIG. 14C provides the PL intensity of b-GQDs at different concentrations. 1 is the starting solution with a concentration of 3 mg/mL. 2 signifies that the concentration of the starting solution has been diluted 2 times, to make the concentration 1.5 mg/mL. The remaining concentrations follow in the same manner. The pH of the solutions was 6. FIG. 14D is a summary of peak intensity and relative quantum yield with respect to the dilution factors. The peak intensity was fitted to $y=1/(0.68+0.28x)$; $R2=0.97$. The normalized quantum yield was fitted to $y=(1.33-x)/(1-x)$; $R2=0.90$.

FIG. 15D shows the photobleaching properties of a-GQDs, c-GQDs, b-GQDs, and fluorescein.

FIG. 17A shows TEM images of a-GQDs. FIG. 17B shows high resolution TEM image of a-GQDs. The inset FFT pattern shows graphitic structure. FIG. 17C shows the size distribution of a-GQDs.

FIG. 19A shows a survey profile. Sodium is likely due to some carboxylates at the edges of the GQDs. This can be removed through acidification. FIG. 19B is a high resolution C1s XPS spectrum of a-GQDs, where the 284.4 eV peak is assigned to C=C is double bonds.

FIG. 21A is a UV-Vis absorbance of a-GQDs. FIG. 21B is a photoluminescent (PL) emission of a-GQDs excited at 345 nm. The inset is a photograph showing fluorescence of a-GQDs in DI water at 0.1 mg mL$^{-1}$.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Graphene quantum dots (GQDs) generally refer to disc-shaped graphene compositions, such as disc-shaped graphene oxides. Graphene quantum dots have found numerous applications. For instance, graphene quantum dots can be used as fluorophores for medical imaging. Graphene quantum dots have been synthesized or fabricated from various carbon-based materials, including fullerenes, glucose, graphite, graphene oxides, carbon nanotubes (CNTs), and carbon fibers. Physical approaches such as lithography have also been used to fabricate graphene quantum dots from various carbon sources. For instance, lithography has been used to etch graphene quantum dots from graphene.

However, current methods for the fabrication of graphene quantum dots suffer from numerous limitations. For instance, lithography techniques are expensive and impractical for the production of bulk quantities of graphene quantum dots. Likewise, current carbon-based materials that are utilized for the production of graphene quantum dots can be expensive in bulk quantities. Moreover, current methods of growing graphene quantum dots may not be able to control the size of the formed graphene quantum dots. Therefore, new methods are required for the bulk production of graphene quantum dots in a controllable manner. Various embodiments of the present disclosure address these needs.

Figure 1:
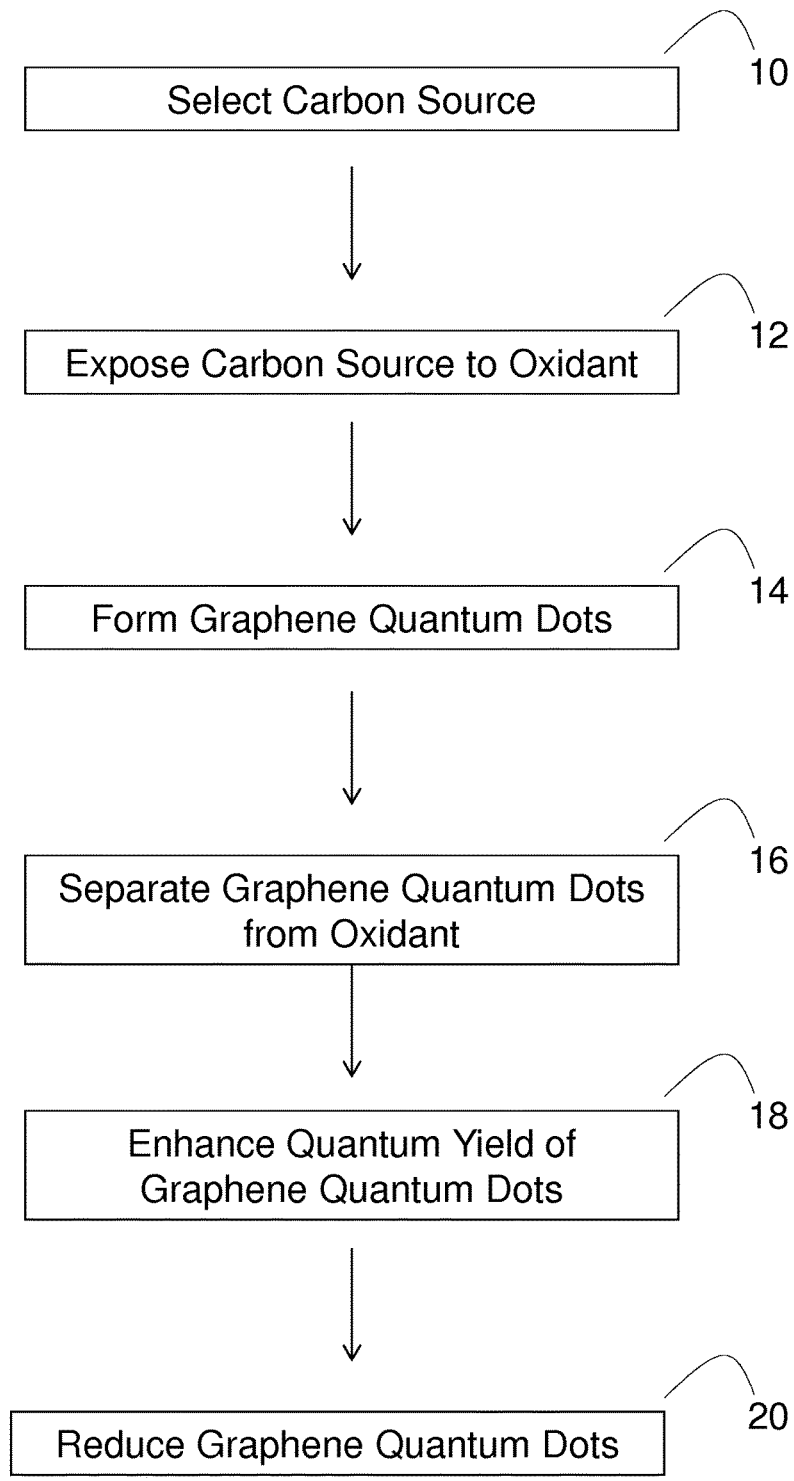
FIG. 1 provides a scheme of a method of preparing graphene quantum dots (GQDs) from a carbon source.

In some embodiments, the present disclosure pertains to methods of making graphene quantum dots from a carbon source, such as coal, coke and combinations thereof. In some embodiments, such methods involve exposing the carbon source to an oxidant. In some embodiments, such exposure results in the formation of graphene quantum dots. In some embodiments illustrated in FIG. 1, the methods of the present disclosure involve: selecting a carbon source (step 10) and exposing the carbon source to an oxidant (step 12) to form graphene quantum dots (step 14). In some embodiments, the methods of the present disclosure can also include a step of separating the formed graphene quantum dots from the oxidant (step 16). In some embodiments, the methods of the present disclosure also include a step of enhancing the quantum yield of the graphene quantum dots, such as through hydrothermal treatment, washing with a sodium hydroxide solution, or both (step 18). In some embodiments, the methods of the present disclosure can also include a step of reducing the formed graphene quantum dots (step 20). As set forth in more detail herein, the methods of the present disclosure may utilize various types of carbon sources, oxidants, quantum yield enhancers, and reducing agents to form various types and sizes of graphene quantum dots in a controllable manner.

Carbon Sources

Various types of carbon sources may be utilized to form graphene quantum dots. In some embodiments, the carbon source is coal.

As summarized in Tables 1 and 2, coal is the most affordable, abundant, and readily combustible energy resource being used worldwide.

TABLE 1

The world's three major regions for coal production and consumption.

| Region | Production (Million Tons) | Consumption (Million Tons) |
|---|---|---|
| Asia Pacific | 2686.3 | 2553.2 |
| North America | 600.0 | 533.7 |
| Europe and Eurasia | 457.1 | 499.2 |

TABLE 2

Recent coal prices in North America.

| Region | Price (US dollars per ton) |
|---|---|
| Central Appalachia 12,500 Btu | 67.27 |
| Northern Appalachia 13,000 Btu, | 64.10 |
| Illinois Basin 11,800 Btu, | 45.15 |
| Powder River Basin 8,800 Btu, | 10.55 |
| Uinta Basin 11,700 Btu | 35.85 |

The structure of coal is complex. The simplified composition contains angstrom or nanometer-sized crystalline carbon domains with defects that are linked by aliphatic amorphous carbon. Although research on the chemistry of coal has been reported, the angstrom- and nano-scale crystalline domains of coal are implied to impede their further use in electrical, mechanical and optical applications. Consequently, coal is still mainly used as an energy source.

Thus, coal's structural characteristics create a perception that coal is only useful for producing energy through burning. By contrast, Applicants have utilized coal for the first time to produce graphene quantum dots.

Various types of coals may be utilized as carbon sources to form graphene quantum dots. In some embodiments, the coal includes, without limitation, anthracite, bituminous coal, sub-bituminous coal, metamorphically altered bituminous coal, asphaltenes, asphalt, peat, lignite, steam coal, petrified oil, and combinations thereof. In some embodiments, the carbon source is bituminous coal. In some embodiments, the carbon source is anthracite.

The use of additional carbon sources can also be envisioned. For instance, in some embodiments, the carbon source is coke. In some embodiments the coke is made from pitch. In some embodiments, the coke is made from bituminous coals. In some embodiments, the coke is made from pitch and bituminous coals. In some embodiments, the carbon source is a combination of coke and coal.

Oxidants

In some embodiments, graphene quantum dots form by exposing the carbon source to a an oxidant. Various oxidants may be utilized to form graphene quantum dots. In some embodiments, the oxidant includes an acid. In some embodiments, the acid includes, without limitation, sulfuric acid, nitric acid, phosphoric acid, hypophosphorous acid, fuming sulfuric acid, hydrochloric acid, oleum (i.e., sulfuric acid with dissolved sulfur trioxide), chlorosulfonic acid, and combinations thereof.

In some embodiments, the oxidant utilized to form graphene quantum dots is a mixture of sulfuric acid and nitric acid. In some embodiments, the oxidant includes, without limitation, potassium permanganate, sodium permanganate, hypophosphorous acid, nitric acid, sulfuric acid, hydrogen peroxide, and combinations thereof. In some embodiments, the oxidant is a mixture of potassium permanganate, sulfuric acid, and hypophosphorous acid.

In some embodiments, the oxidant is in the form of a liquid medium, such as a liquid solution. In some embodiments, the oxidant includes an anion. In some embodiments, the oxidant includes, without limitation, permanganates (e.g., potassium permanganate, sodium permanganate, and ammonium permanganate), chlorates (e.g., sodium chlorates and potassium chlorates), perchlorates, hypochlorites (e.g., potassium hypochlorites and sodium hypochlorites), hypobromites, hypoiodites, chromates, dichromates, nitrates, nitric acid, sulfuric acid, chlorosulfonic acid, oleum, and combinations thereof. In more specific embodiments, the oxidant includes, without limitation, potassium permanganate, potassium chlorate, hydrogen peroxide, ozone, nitric acid, sulfuric acid, oleum, chorosulfonic acid, and combinations thereof.

In more specific embodiments, the oxidant includes a compound that is dissolved in an acid. In some embodiments, the compound includes, without limitation, permanganates (e.g., potassium permanganate, sodium permanganate, and ammonium permanganate), chlorates (e.g., sodium chlorates and potassium chlorates), perchlorates, hypochlorites, hypobromites, hypoiodites, chromates, dichromates, nitrates, nitric acid, peroxides (e.g., hydrogen peroxide), ozone, and combinations of thereof. In some embodiments, the acid includes, without limitation, sulfuric acid, nitric acid, oleum, chorosulfonic acid, and combinations thereof.

In more specific embodiments, the compound includes at least one of potassium permanganate, sodium hypochlorite, potassium hypochlorite, potassium chlorate, nitric acid, and combinations thereof. In additional embodiments, the compound is dissolved in sulfuric acid.

In further embodiments, the oxidant is potassium permanganate dissolved in sulfuric acid (also referred to as $KMnO_4/H_2SO_4$). In some embodiments, the oxidant is nitric acid dissolved in sulfuric acid (also referred to as $HNO_3/H_2SO_4$). The utilization of additional oxidants can also be envisioned.

Exposure of Carbon Sources to Oxidants

Various methods may be utilized to expose carbon sources to oxidants. In some embodiments, the exposing occurs while the carbon source and the oxidant are in a liquid solution. In some embodiments, the exposing includes sonicating the carbon source in the presence of the oxidant. In some embodiments, the exposing includes stirring the carbon source in the presence of the oxidant. In some embodiments, the exposing includes heating the carbon source in the presence of the oxidant. In some embodiments, the heating occurs at temperatures of at least about 100° C. In some embodiments, the heating occurs at temperatures ranging from about 100° C. to about 150° C.

In some embodiments, two or more oxidants may be exposed to the carbon source in a sequential manner. For instance, in some embodiments, a first oxidant is mixed with a carbon source. Thereafter, a second oxidant is mixed with the carbon source. In some embodiments, the first oxidant is sulfuric acid and the second oxidant is nitric acid. Additional methods of exposing carbon sources to oxidants can also be envisioned.

The exposure of carbon sources to oxidants can lead to the formation of graphene quantum dots. Without being bound by theory, Applicants envision that, upon the exposure of coal or coke to oxidants, graphene quantum dots form by exfoliation of the carbon source by the oxidants. In particular, Applicants envision that the crystalline carbon within the coal structure is oxidatively displaced to form graphene quantum dots.

Separation of Graphene Quantum Dots from Oxidants

In some embodiments, the methods of the present disclosure also include a step of separating the formed graphene quantum dots from oxidants. In some embodiments, the separating includes neutralizing a solution that contains the formed graphene quantum dots, filtering the solution, and dialyzing the solution. In some embodiments, the separating step includes dialyzing a solution that contains the formed graphene quantum dots. Additional methods of separating graphene quantum dots from oxidants can also be envisioned.

Enhancing the Quantum Yield of Graphene Quantum Dots

In some embodiments, the methods of the present disclosure also include a step of enhancing the quantum yield of the graphene quantum dots. In some embodiments, the enhancing occurs by hydrothermal treatment of the graphene quantum dots, treatment of the graphene quantum dots with one or more bases (e.g., sodium hydroxide), treatment of the graphene quantum dots with one or more hydroxides, treatment of the graphene quantum dots with one or more dopants (e.g., $NaH_3$, $NaHSe$, $NaH_2PO_3$), and combinations of such treatments.

In more specific embodiments, the quantum yield of the graphene quantum dots can be enhanced by treating the graphene quantum dots with hydroxide in water to increase their quantum yield. In further embodiments, the quantum yield of the graphene quantum dots can be enhanced by hydrothermal treatment of the graphene quantum dots. In some embodiments, the hydrothermal treatment of the graphene quantum dots involves treating the graphene quantum dots with water under pressure in a container (e.g., a sealed vessel) at temperatures above 100° C. (e.g., temperatures of about 180 to 200° C.). In further embodiments, the quantum yield of the graphene quantum dots can be enhanced by a combined hydrothermal treatment and hydroxide treatment of the graphene quantum dots. Additional methods of enhancing the quantum yield of graphene quantum dots can also be envisioned.

In some embodiments, the enhancement step enhances the quantum yield of the graphene quantum dots by at least about 50%, at least about 100%, at least about 200%, at least about 1,500%, at least about 1,700%, or at least about 2,000%. In some embodiments, the enhancement step enhances the quantum yield of the graphene quantum dots by at least about 2,000%.

Reduction of Formed Graphene Quantum Dots

In some embodiments, the methods of the present disclosure also include a step of reducing the formed graphene quantum dots. In some embodiments, the reducing includes exposure of the formed graphene quantum dots to a reducing agent. In some embodiments, the reducing agent includes, without limitation, hydrazine, sodium borohydride, heat, light, sulfur, sodium sulfide, sodium hydrogen sulfide, and combinations thereof. Additional methods by which to reduce graphene quantum dots can also be envisioned.

In some embodiments, the non-reduced versions of graphene quantum dots are water soluble. In some embodiments, the reduced versions of graphene quantum dots are soluble in organic solvents.

Control of Graphene Quantum Dot Formation

In some embodiments, the methods of the present disclosure also include one or more steps of controlling the shape or size of the formed graphene quantum dots. For instance, in some embodiments, the methods of the present disclosure may include a step of controlling the diameter of the formed graphene quantum dots. In some embodiments, the step of controlling the diameter of the formed graphene quantum dots includes selecting the carbon source. For instance, in some embodiments, the selected carbon source is bituminous coal, and the formed graphene quantum dots have diameters ranging from about 1 nm to about 5 nm. In some embodiments, the selected carbon source is anthracite, and the formed graphene quantum dots have diameters ranging from about 10 nm to about 50 nm. In some embodiments, the selected carbon source is coke, and the formed graphene quantum dots have diameters ranging from about 2 nm to about 10 nm.

Formed Graphene Quantum Dots

The methods of the present disclosure may be utilized to form various types of graphene quantum dots with various sizes. For instance, in some embodiments, the formed graphene quantum dots have diameters ranging from about 1 nm to about 50 nm. In some embodiments, the formed graphene quantum dots have diameters ranging from about 18 nm to about 40 nm. In some embodiments, the formed graphene quantum dots have diameters ranging from about 1 nm to about 20 nm. In some embodiments, the formed graphene quantum dots have diameters ranging from about 1 nm to about 10 nm. In some embodiments, the formed graphene quantum dots have diameters ranging from about 1 nm to about 20 nm. In some embodiments, the formed graphene quantum dots have diameters ranging from about 1 nm to about 7.5 nm. In some embodiments, the formed graphene quantum dots have diameters ranging from about 4 nm to about 7.5 nm. In some embodiments, the formed graphene quantum dots have diameters ranging from about 1 nm to about 5 nm. In some embodiments, the formed graphene quantum dots have diameters ranging from about 1.5 nm to about 3 nm. In some embodiments, the formed graphene quantum dots have diameters ranging from about 2 nm to about 4 nm. In some embodiments, the formed graphene quantum dots have diameters of about 3 nm. In some embodiments, the formed graphene quantum dots have diameters of about 2 nm.

In more specific embodiments, the carbon source used to form graphene quantum dots is bituminous coal, and the formed graphene quantum dots have diameters ranging from about 1 nm to about 5 nm, from about 2 nm to 4 nm, or from about 1.5 nm to about 3 nm. In some embodiments, the carbon source used to form graphene quantum dots is bituminous coal, and the formed graphene quantum dots have diameters of about 3 nm. In some embodiments, the carbon source used to form graphene quantum dots is bituminous coal, and the formed graphene quantum dots have diameters of about 2 nm.

In some embodiments, the carbon source used to form graphene quantum dots is anthracite, and the formed graphene quantum dots have diameters ranging from about 10 nm to about 50 nm. In some embodiments, the carbon source used to form graphene quantum dots is anthracite, and the formed graphene quantum dots have diameters ranging from about 18 nm to about 40 nm.

In some embodiments, the carbon source used to form graphene quantum dots is coke, and the formed graphene quantum dots have diameters ranging from about 2 nm to about 10 nm, from about 4 nm to 8 nm, or from about 4 nm to about 7.5 nm. In some embodiments, the carbon source used to form graphene quantum dots is coke, and the formed graphene quantum dots have diameters of about 6 nm. In some embodiments, the carbon source used to form graphene quantum dots is coke, and the formed graphene quantum dots have diameters of about 7.5 nm.

The formed graphene dots of the present disclosure can also have various structures. For instance, in some embodiments, the formed graphene quantum dots have a crystalline hexagonal structure. In some embodiments, the formed graphene quantum dots have a single layer. In some embodiments, the formed graphene quantum dots have multiple layers. In some embodiments, the formed graphene quantum dots have from about two layers to about four layers. In some embodiments, the formed graphene quantum dots have heights ranging from about 1 nm to about 5 nm.

In some embodiments, the formed graphene quantum dots are functionalized with a plurality of functional groups. In some embodiments, the functional groups include, without limitation, amorphous carbon addends, oxygen groups, carbonyl groups, carboxyl groups, esters, amines, amides, and combinations thereof. In some embodiments, the formed graphene quantum dots are edge functionalized. In some embodiments, the formed graphene quantum dots include oxygen addends on their edges. In some embodiments, the formed graphene quantum dots include amorphous carbon addends on their edges. In some embodiments, the addends can be appended to graphene quantum dots by amide or ester bonds.

In some embodiments, the functional groups on the graphene quantum dots can be converted to other functional groups. For instance, in some embodiments, the graphene quantum dots can be heated with an alcohol or phenol to convert the graphene quantum dots' carboxyl groups to esters. In some embodiments, the graphene quantum dots can be heated with an alkylamine or aniline to convert the graphene quantum dots' carboxyl groups to amides. In some embodiments, the graphene quantum dots can be treated with thionyl chloride or oxalyl chloride to convert the graphene quantum dots' carboxyl groups to acid chlorides, and then treated with alcohols or amines to form esters or amides, respectively. Depending on the length of the alcohols or amines used, such steps could render different solubility properties to the graphene quantum dots. For instance, the more aliphatic or aromatic the addends, the less water soluble and the more organic soluble would be the graphene quantum dot.

The methods of the present disclosure may be utilized to form various amounts of graphene quantum dots from carbon sources. In some embodiments, the yields of isolated graphene quantum dots from carbon sources range from about 10% by weight to about 50% by weight. In some embodiments, the yields of isolated graphene quantum dots from carbon sources range from about 10% by weight to about 20% by weight.

In some embodiments, the methods of the present disclosure may be utilized to produce bulk amounts of graphene quantum dots. In some embodiments, the bulk amounts of produced graphene quantum dots range from about 10 kg to one or more tons. In some embodiments, the bulk amounts of produced graphene quantum dots range from about 1 g to about 10 kg. In some embodiments, the bulk amounts of produced graphene quantum dots range from about 1 g to about 1 kg. In some embodiments, the bulk amounts of produced graphene quantum dots range from about 1 g to about 500 g.

The graphene quantum dots of the present disclosure may also have various quantum yields. For instance, in some embodiments, the quantum yields of the graphene quantum dots are less than 1% and greater than 0.1%. In some embodiments, the quantum yields of the graphene quantum dots are between 1% and 10%. In some embodiments, the quantum yields of the graphene quantum dots can be as high 50%. In some embodiments, the quantum yields of the graphene quantum dots may be near 100%.

Advantages

As set forth in more detail herein, Applicants have established that the unique coal and coke structures have an advantage over their pure $sp^2$ carbon allotropes for producing graphene quantum dots. Without being bound by theory, it is envisioned that the amorphous carbon within the coal and coke structures is easier to displace under the oxidation conditions typically used when compared with reaction on pure $sp^2$ carbon structures. As such, the methods of the present disclosure provide new and effective methods of producing bulk quantities of graphene quantum dots in a controllable manner from various types of coals and cokes.

Moreover, Applicants envision that the graphene quantum dots of the present disclosure can find numerous applications. For instance, the graphene quantum dots of the present disclosure can find applications in road stickers, road signs, coatings, clothing, paints, photographic processing materials, and combinations thereof.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Preparation of Graphene Quantum Dots from Coal and Coke

In this Example, Applicants report a facile approach to synthesize tunable graphene quantum dots from various types of coal and coke. Applicants also establish that the unique coal and coke structures have advantages over pure $sp^2$-carbon allotropes for producing graphene quantum dots. For instance, the crystalline carbon within the coal structure is easier to oxidatively displace than when pure $sp^2$-carbon structures are used, resulting in nanometer-sized graphene quantum dots with amorphous carbon addends on the edges. The synthesized graphene quantum dots, produced in up to 20% isolated yield from coal and coke in a cost effective manner, are soluble and fluorescent in aqueous solution.

Figure 2:
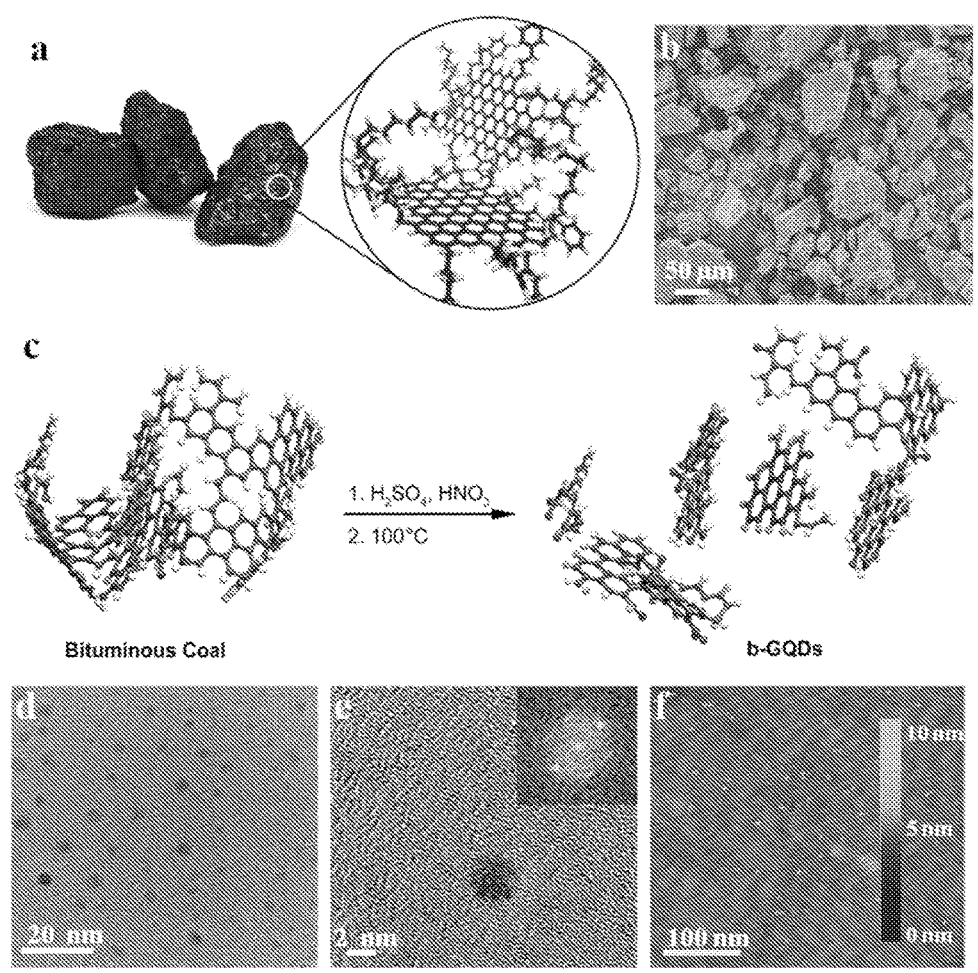
FIG. 2 provides schemes and data relating to the synthesis and characterization of GQDs produced from bituminous coal (b-GQDs).
Figure 3:
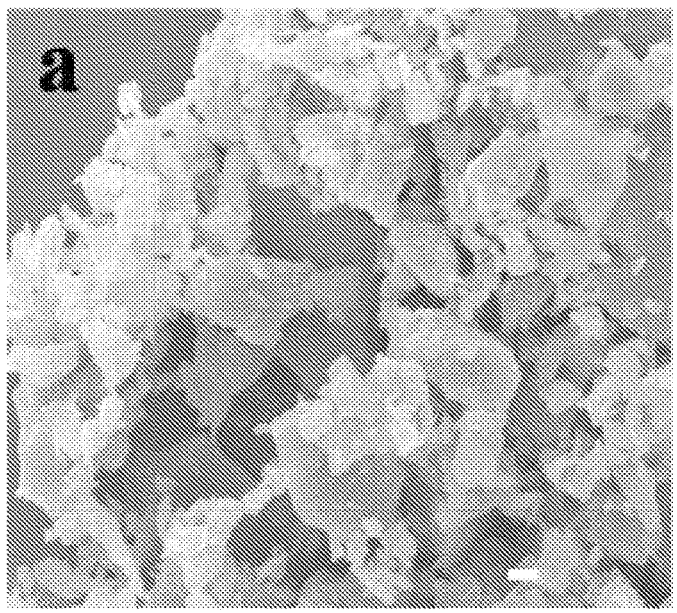
FIG. 3 provides SEM images of various carbon sources.
Figure 3:
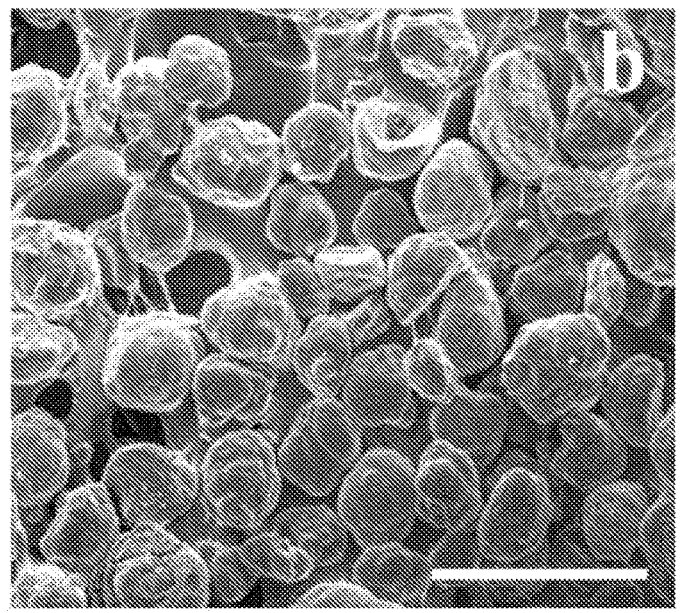

In this Example, Applicants used an inexpensive facile one-step wet-chemistry route to fabricate GQDs from three types of carbon sources: anthracite ("a"), bituminous coal ("b") and coke ("c"). FIG. 2A illustrates the macro-scale image and simplified nanostructure of coal before any heat treatment. The crystalline domains are connected by aliphatic amorphous carbon chains. Scanning electron microscopy (SEM) shows that ground bituminous coal (FIG. 2B) and anthracite (FIG. 3A) have irregular size and shape distributions, but coke (FIG. 3B) has a regular spherical shape.

Figure 4:
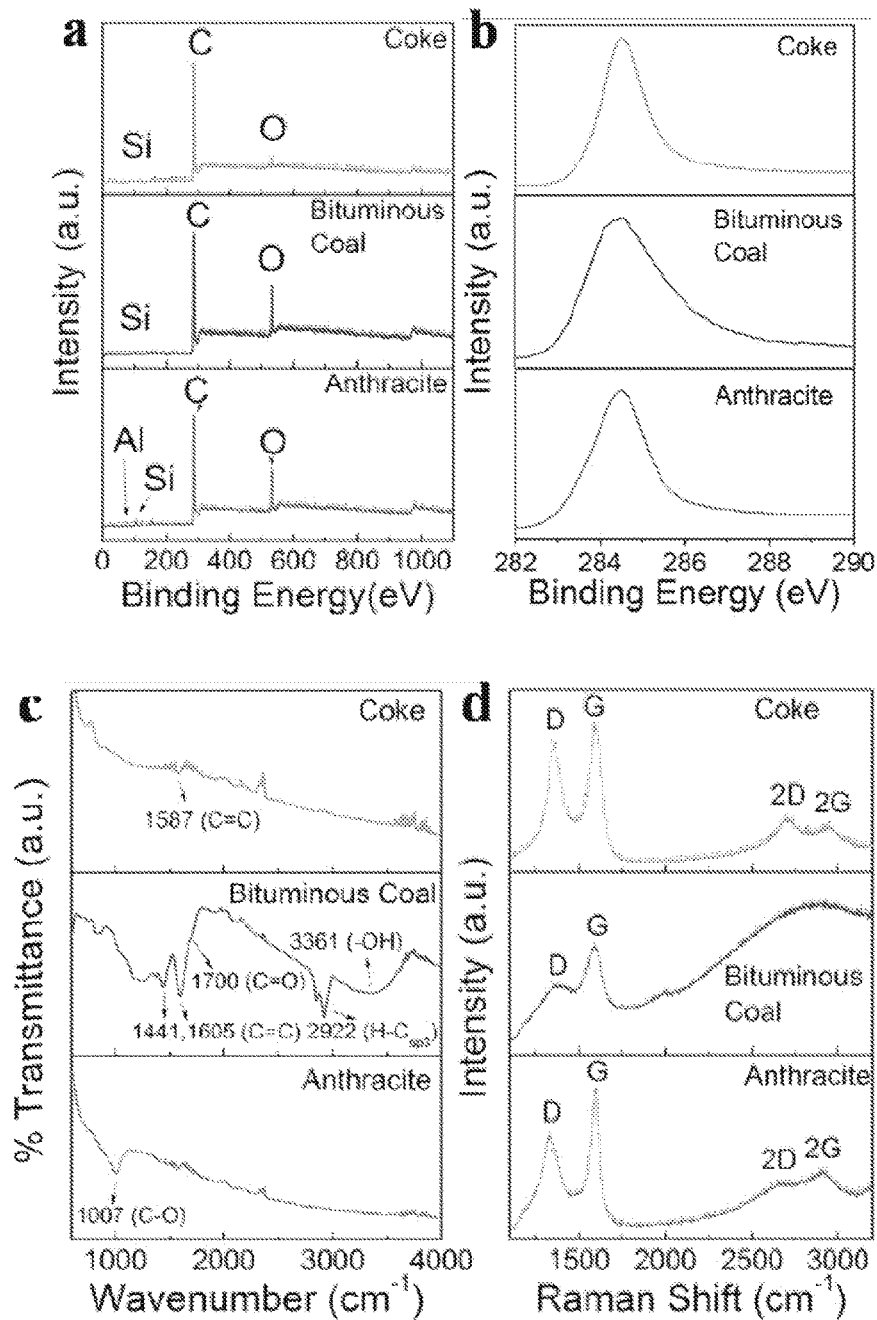
FIG. 4 provides data relating to the characterization of various carbon sources.

The chemical compositions of the carbon sources were investigated by X-ray photoelectron spectroscopy (XPS) and are summarized in FIGS. 4A-B and Table 3.

TABLE 3

Summary of atomic concentrations of carbon sources.

| Carbon | Elements (%) | | | |
| --- | --- | --- | --- | --- |
|  | C | O | Al | Si |
| Anthracite | 72.94 | 17.29 | 3.15 | 4.62 |
| Bituminous coal | 84.48 | 14.86 | 0 | 0.65 |
| Coke | 93.69 | 5.51 | 0 | 0.8 |

The C1s high resolution XPS reveals that bituminous coal has more carbon oxidation than anthracite and coke. The solid state Fourier transform infrared (ssFTIR) spectra (FIG. 4C) are consistent with the XPS results, showing the presence of C—O, C=O, H—$C_{sp3}$ and O—H vibration modes for bituminous coal. A C—O vibration mode was apparent for anthracite but not for coke, which is obtained from devolatilization and carbonization of tars and pitches. The Raman spectra (FIG. 4D) of anthracite and coke show D, G, 2D and 2G peaks, while no apparent 2D and 2G peak is observed for bituminous coal. It is therefore seen that anthracite and coke contain certain amounts of graphite-like stacking domains, while bituminous coal has a higher proportion of aliphatic carbon and smaller polyaromatic domains.

Figure 5:
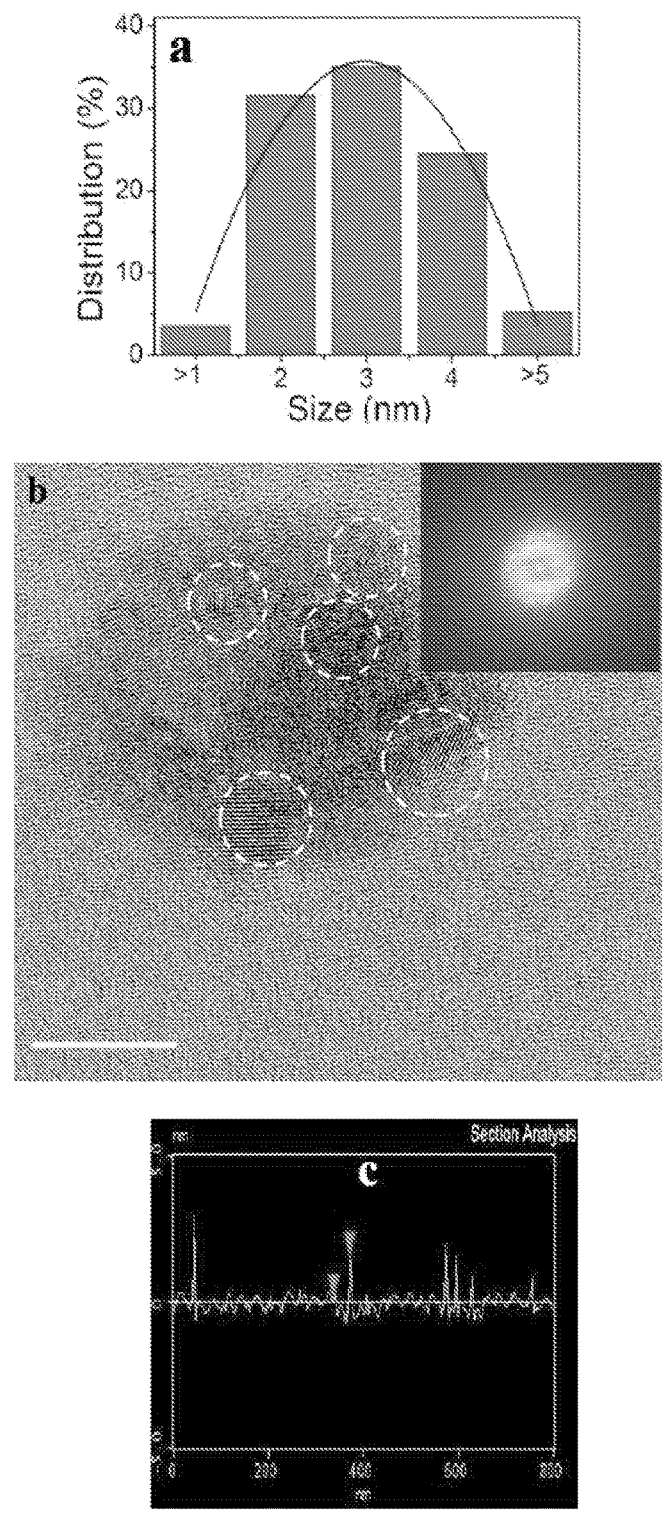
FIG. 5 provides data relating to the characterization of b-GQDs.

As depicted in FIG. 2C, the GQDs derived from bituminous coal were obtained by sonicating the bituminous coal in concentrated sulfuric acid and nitric acid, followed by heat treatment at 100 or 120° C. for 24 h. The microstructure of 100° C.-derived bituminous coal GQDs (b-GQDs) was investigated by transmission electron microscopy (TEM). FIG. 2D shows the b-GQDs with uniformly distributed sizes and shapes that are 2.96±0.96 nm in diameter (FIG. 5A). The fast Fourier transform (FFT) pattern of representative b-GQDs is inset in the corresponding high resolution TEM (HRTEM) image (FIG. 2E). The observed hexagonal lattice in the FFT images reveals that the b-GQDs are crystalline hexagonal structures. Applicants also observed a few larger dots (>20 nm) that were not fully cut. In addition, Applicants saw many crystalline domains within the dots that are linked by amorphous carbon (FIG. 5B). This supports the proposed micro-structure of coal. An atomic force microscopy (AFM) image of the b-GQDs reveals that their heights are 1.5 to 3 nm (FIGS. 2F and 5C), suggesting that there are 2 to 4 layers of graphene oxide-like structures.

Figure 6:
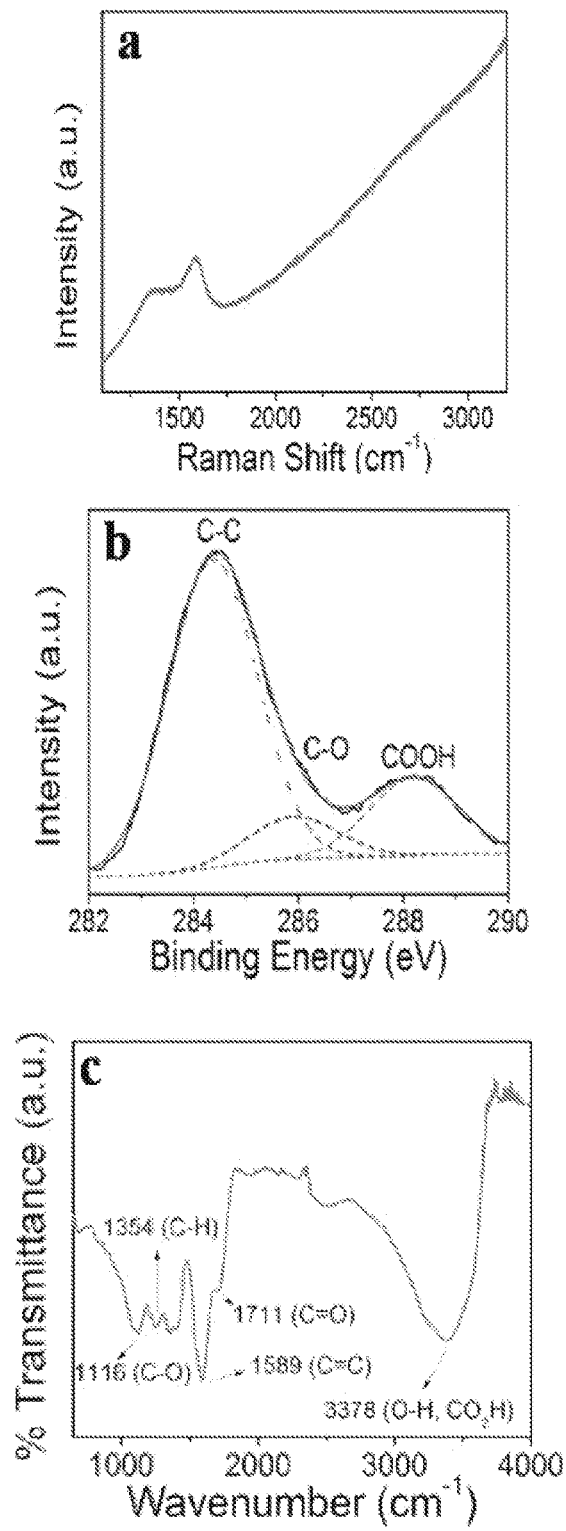
FIG. 6 provides data relating to the characterization of b-GQDs.

As expected, the integrated intensity ratios of amorphous D bands to crystalline G bands ($I_D/I_G$) for bituminous coal is 1.06±0.12, which increased to 1.55±0.19 after oxidative cutting into b-GQDs (FIG. 6A), owing to the introduction of defects to the basal planes and the edges. The b-GQDs show high solubility in water (>15 mg/mL), which is attributed to the introduction of hydrophilic functionalities. This is verified by the high resolution C1s XPS (FIG. 6B) where a new shoulder at 288.3 eV is present, corresponding to the carboxyl groups. The functionalization is also confirmed by the increased intensity of C—O, C=O and O—H vibration modes in the ssFTIR spectrum (FIG. 6C).

Figure 7:
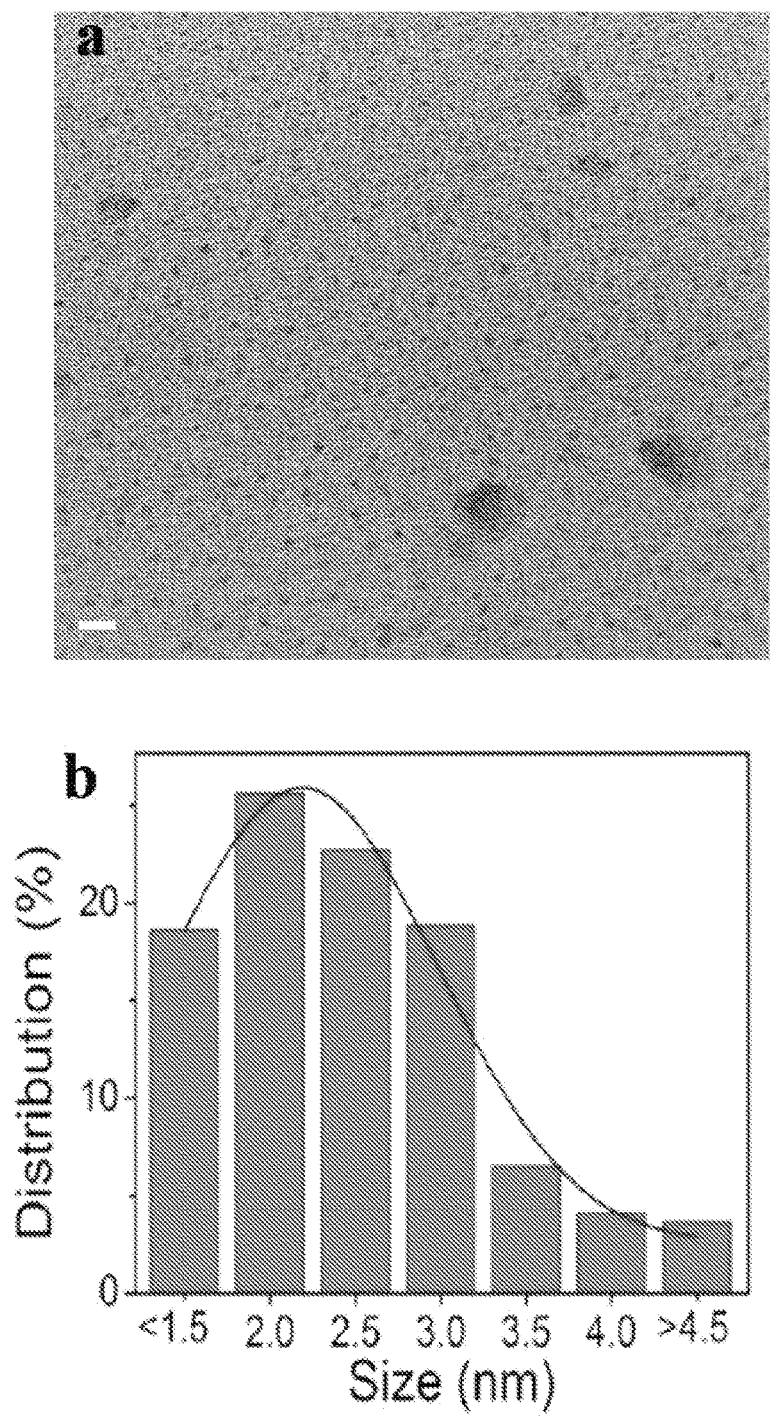
FIG. 7 provides data relating to the TEM characterization of b-GQDs.

The size of b-GQDs can be tuned by varying the oxidation cutting temperature. GQDs from bituminous coal produced at 120° C. (b-GQDs*) were characterized by TEM (FIG. 7A). The size and shape of b-GQDs* are normally distributed with an average diameter of 2.30±0.78 nm (FIG. 7B).

Figure 8:
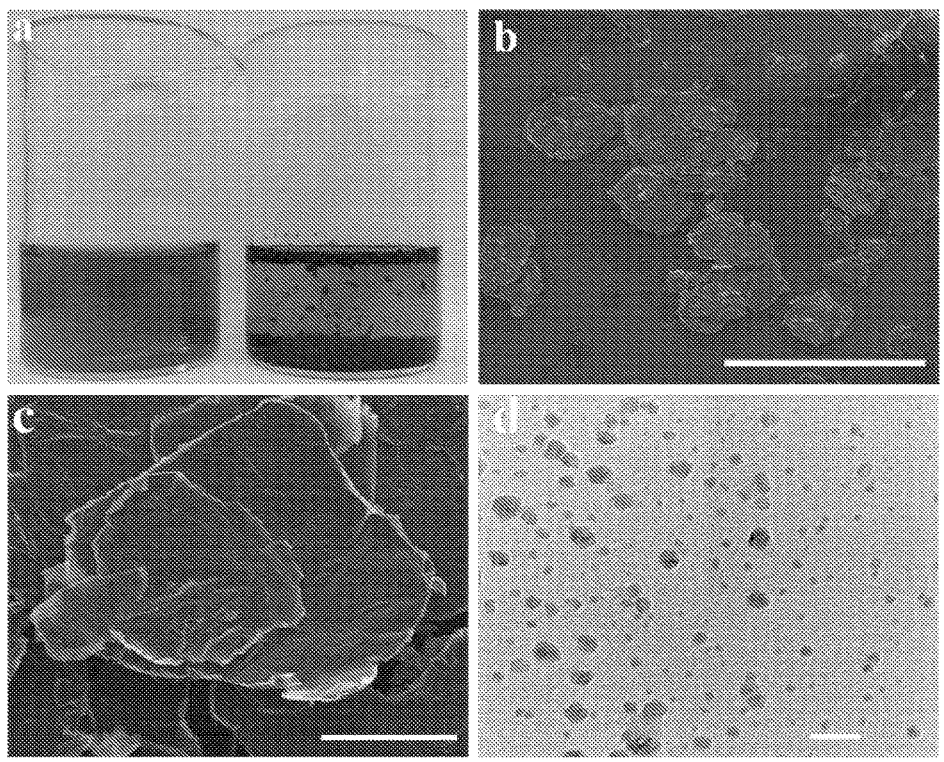
FIG. 8 provides comparative images of GQDs prepared from coal and graphite. The left beaker in FIG. 8A contains bituminous coal oxidized at 100° C. with sulfuric and nitric acids for 24 h. The right beaker in FIG. 8A is graphite treated under the same conditions.

To show the advantage of coal and coke over pure sp²-carbon large flake graphite structures for synthesizing GQDs, Applicants treated graphite (Sigma-Aldrich, ca. 150 µm flakes) under the same oxidative reaction conditions used for bituminous coal. The solution of bituminous coal after the oxidation reaction was clear with little sediment at the bottom of the beaker, while the graphite reaction product contained large amounts of black graphite flakes (FIG. 8A). After filtration and washing of the graphite-derived mixture with aqueous and organic solvents, the collected dried graphite flakes represent 95% w/w of starting material. The SEM images of these treated graphite flakes (FIGS. 8B-C) show that they retain their original size and structure with flakes >100 µm. This is because the large graphite structure usually requires stronger oxidative reaction conditions, such as $KMnO_4$ with $H_3PO_4$ and $H_2SO_4$ that were used for synthesizing graphene oxide. The disordered configuration and small crystalline domains that appear in coal confer advantages over graphite, such as easy dispersion, exfoliation, functionalization and chemical cutting. Indeed, the stronger $KMnO_4/H_3PO_4/H_2SO_4$ conditions can afford GQDs from coal, as shown in FIG. 8D. However, the workup is more laborious for the removal of the manganese salts. When using fuming sulfuric acid and fuming nitric acid, higher degrees of exfoliation and oxidation of the final GQDs were attained.

Figure 9:
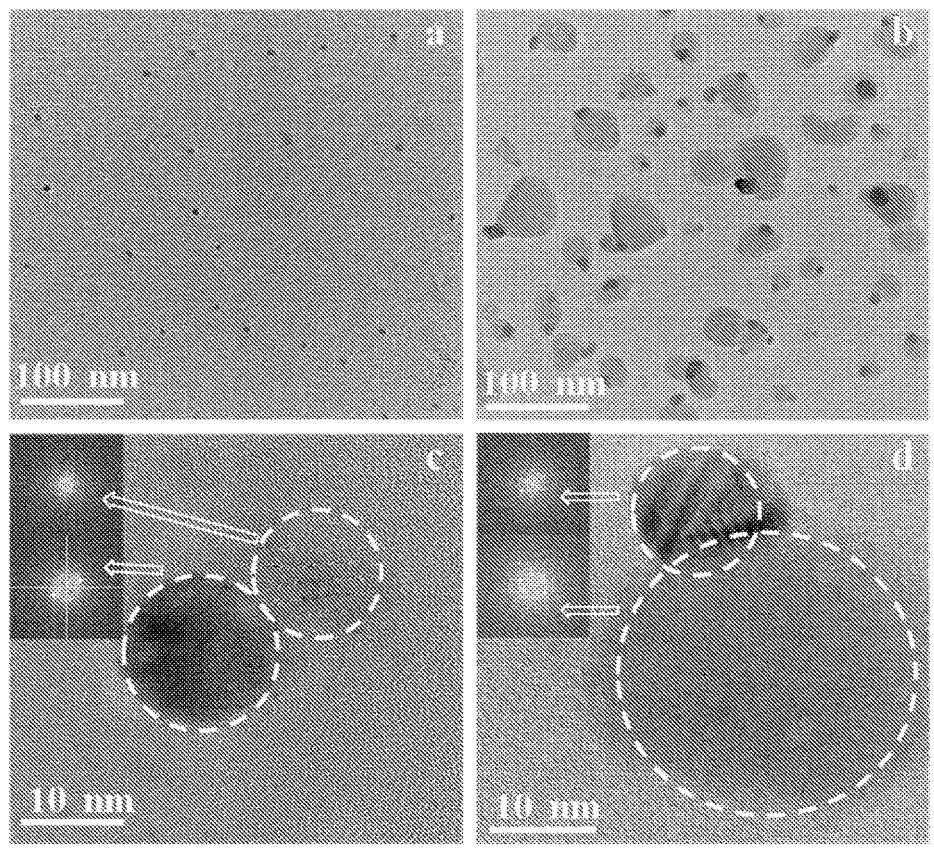
FIG. 9 provides TEM images of GQDs produced from coke (c-GQDs) and anthracite (a-GQDs).
Figure 10:
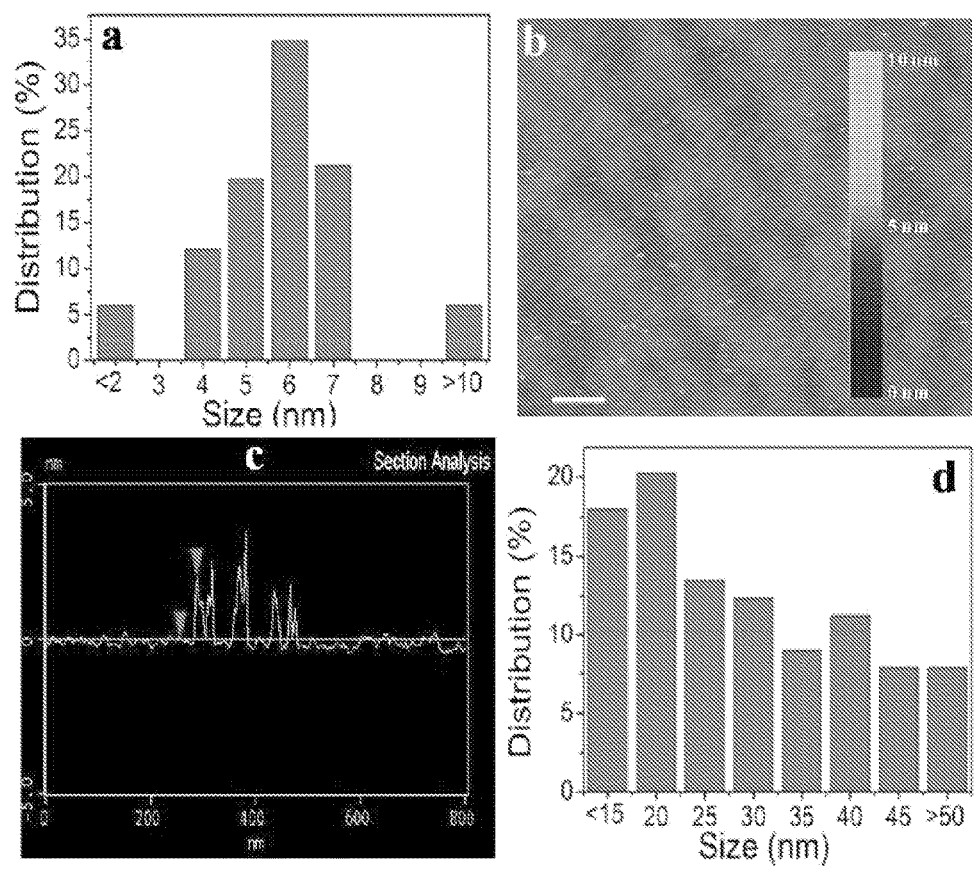
FIG. 10 provides data relating to the characterization of c-GQDs and a-GQDs.
Figure 11:
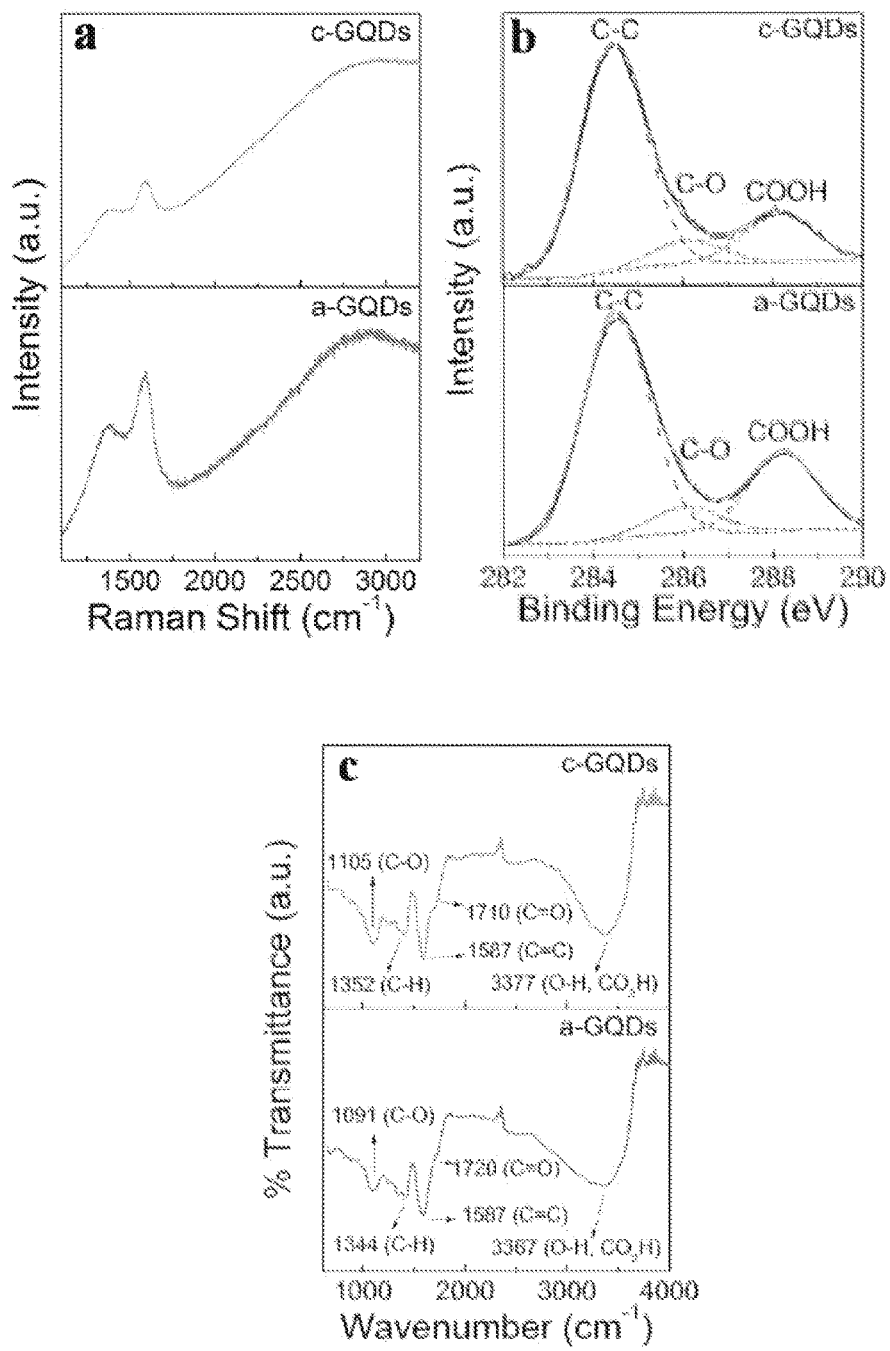
FIG. 11 provides data relating to the further characterization of c-GQDs and a-GQDs.

GQDs were also synthesized from coke and anthracite using the same method that was used for bituminous coal. GQDs from coke (c-GQDs) and anthracite (a-GQDs) were characterized using the same analytical techniques as used with b-GQDs. The TEM image of c-GQDs (FIG. 9A) shows a uniform size of 5.8±1.7 nm (FIG. 10A). The a-GQDs were in a stacked structure with a small round layer atop a larger thinner layer (FIG. 9B). The stacked structure was further confirmed by AFM (FIGS. 10B-C). The height profile shows several areas with two adjacent peaks in which the higher peak is 1 to 2 layers higher than the base layer. The average diameter of the larger stacks of a-GQDs is 29±11 nm (FIG. 10D). HRTEM images of c-GQD and a-GQD with the corresponding FFT pattern inset both show crystalline hexagonal structures (FIGS. 9C-D). Both c-GQDs and a-GQDs show high solubility in water. In addition, their Raman, XPS, and ssFTIR spectra (FIGS. 11A-C) are similar to those of b-GQD. The $I_D/I_G$ ratios of the coal and corresponding GQDs are summarized in Table 4.

TABLE 4

Summary of $I_D/I_G$ for carbon sources and corresponding GQDs.

| Materials | $I_D/I_G$ |
| --- | --- |
| Anthracite | 1.50 ± 0.11 |
| a-GQDs | 1.90 ± 0.22 |
| Bituminous coal | 1.06 ± 0.12 |
| b-GQDs | 1.55 ± 0.19 |
| Coke | 1.02 ± 0.15 |
| c-GQDs | 1.28 ± 0.18 |

Figure 12:
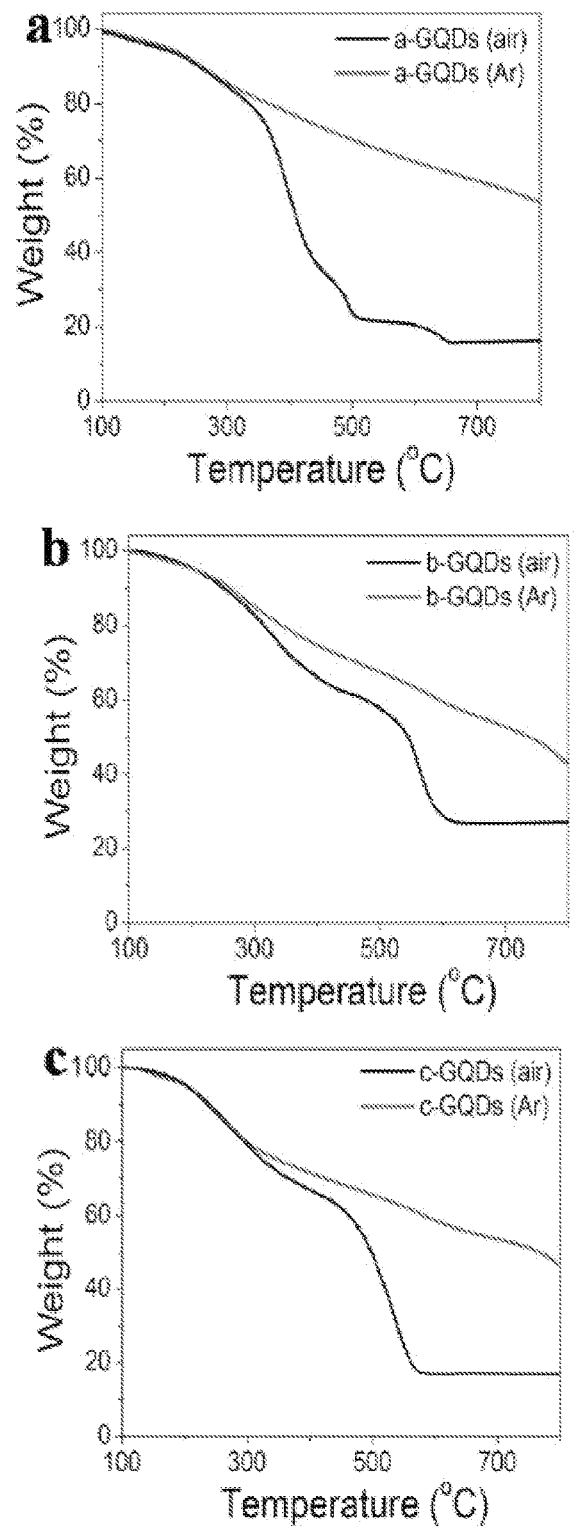
FIG. 12 provides the TGA characterizations of GQDs in air and argon (Ar), including a-GQDs (FIG. 12A), b-GQDs (FIG. 12B), and c-GQDs (FIG. 12C).

Oxidative (in air) and non-oxidative (in argon) thermal gravimetric analysis (TGA) were performed on the GQDs (FIG. 12). GQDs tested in air tended to have higher weight loss and were less stable than those tested in argon using the same temperature program. The difference in weight loss of the GQDs is attributed to their different oxidation levels. The water content of GQDs is summarized in Table 5.

TABLE 5

Water content in GQDs samples.

| Type of GQDs | Water content (wt %) |
| --- | --- |
| a-GQDs | 13.8 ± 1.3 |
| b-GQDs | 12.5 ± 1.1 |
| c-GQDs | 11.3 ± 1.3 |

In terms of size and shape, b-GQDs are smaller and more uniform than c-GQDs and a-GQDs, which likely originate from the different intrinsic morphologies of the starting coals. The yields of isolated GQDs from these three carbon sources are 10 to 20 wt. % (noting that oxidation has increased the weight of the final structures).

Figure 13:
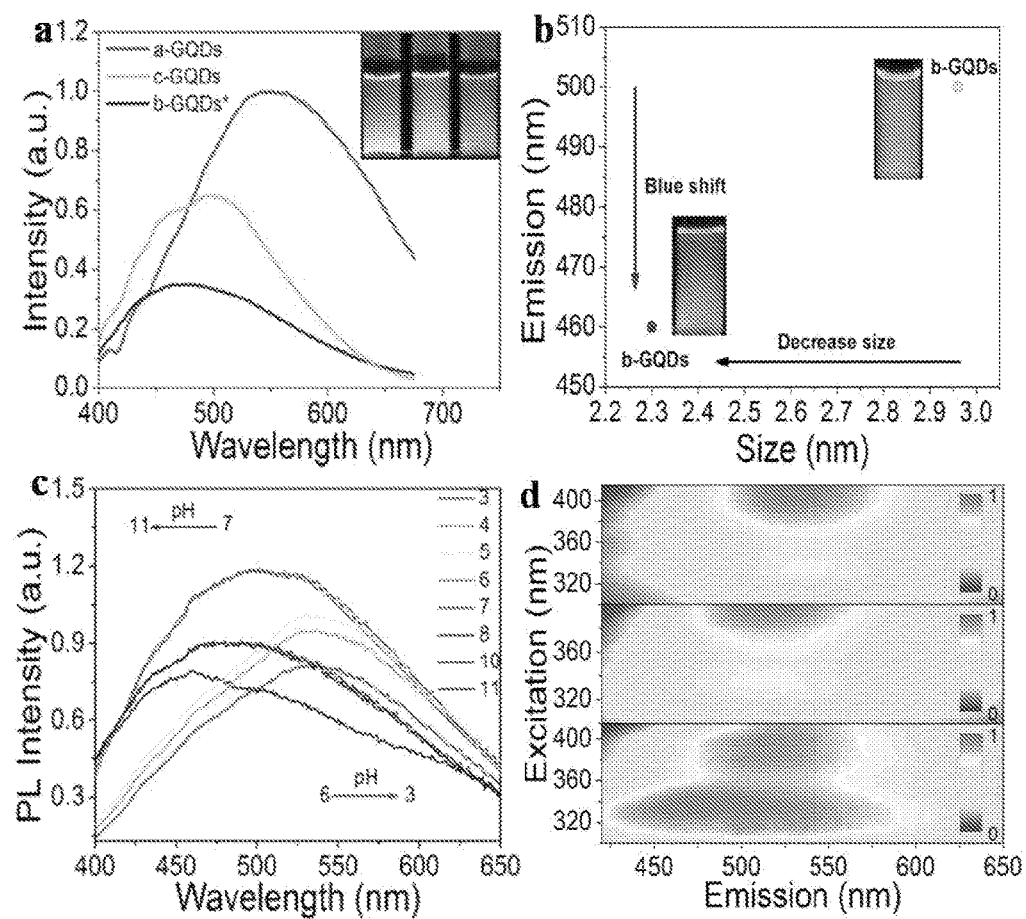
FIG. 13 provides data relating to the photophysical characterizations of GQDs.
Figure 14:
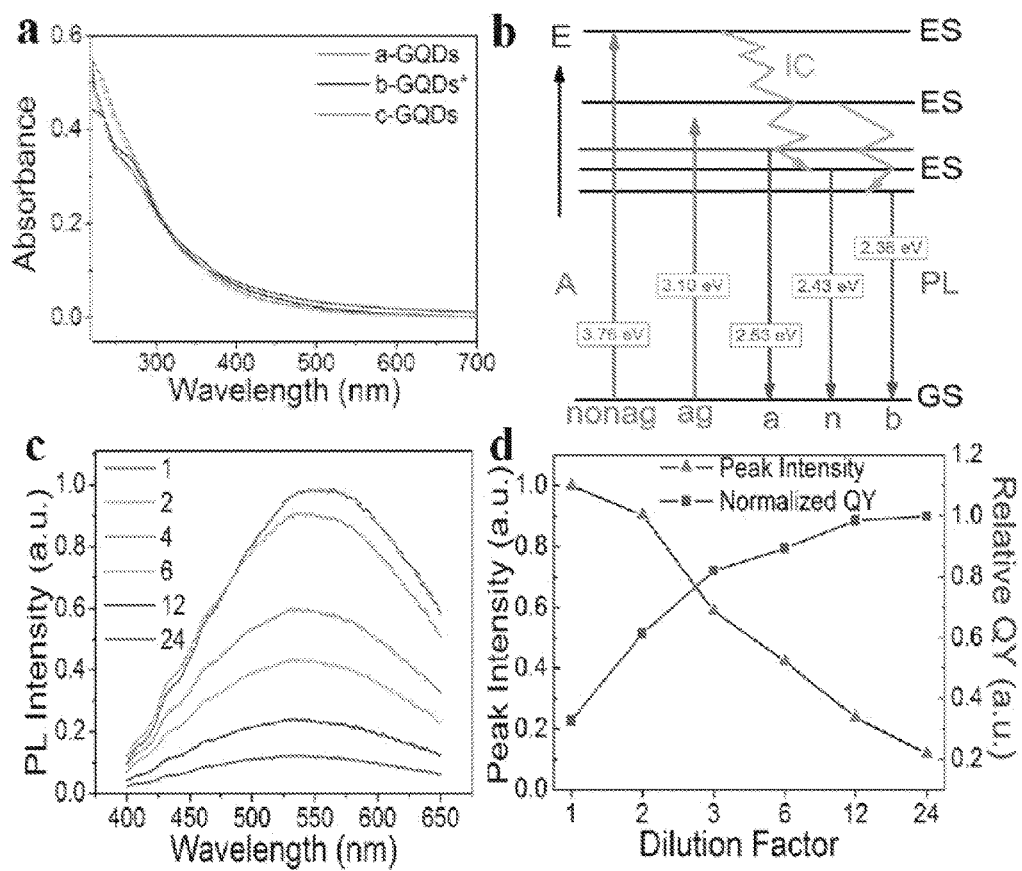
FIG. 14 provides additional data relating to the photophysical characterizations of GQDs.

The photophysical properties of the GQDs were investigated by ultraviolet-visible (UV) spectroscopy, photoluminescence (PL) spectroscopy and time-correlated single-photon counting spectroscopy. FIG. 13A shows the PL emission spectra of a-GQDs, b-GQDs* and c-GQDs excited at 345 nm. The corresponding UV absorption is depicted in FIG. 14A. The emission maxima of a-GQDs, c-GQDs and b-GQDs*solutions are at 530 nm, 480 nm and 450 nm, corresponding to the orange-yellow, green and blue fluorescence, respectively, shown in the inset photograph of FIG. 13A. The PL mechanism of GQDs is affected by their size, zigzag edge sites and the defects effect. Applicants note that the PL intensities follows the trend of a-GQDs>c-GQDs>b-GQDs*, the same trend as their sizes and Raman $I_D/I_G$ values. This is consistent with other work showing that larger GQDs with higher defects usually give enhanced PL intensity.

The quantum confinement effect is a major property of quantum dots that has a size dependent effect on their PL properties. Smaller quantum dots usually lead to a blue-shifted emission. To confirm the quantum confinement effect, Applicants plotted the PL emission wavelength vs. the size of the dots, as shown in FIG. 13B. When the size of the dots changed from 2.96 nm (b-GQDs) to 2.30 nm (b-GQDs*), the emission wavelength blue shifted from 500 nm to 460 nm. This suggests that these carbon dots are quantum dots.

PL emission was found to be pH-dependent. A gradient PL intensity change of b-GQDs with pH is shown in FIG. 13C. The intensity maximizes at pH 6 and 7. A red shift from 500 nm to 550 nm with decreasing intensity was observed as the pH changed from 6 to 3. When the pH increased from 7 to 10, the PL intensity decreased and blue shifted to 450 nm. FIG. 13D reveals the excitation-emission contour maps of b-GQDs in buffered solutions of NaOAc/HOAc (pH 3), $NaH_2PO_4$/NaOH (pH 7) and $NaHCO_3$/NaOH (pH 11). The Stokes shift obtained from excitation/emission peaks in the contour map was ca. 110 nm, attributed to the regular distribution of GQDs. In acid and neutral pH environments, the excitation wavelength maximizes at 380 to 400 nm, while in alkaline solution, a new peak of PL excitation (PLE) appears at 310 to 345 nm. It is suspected that the excitation band from 380 to 400 nm corresponds to the excitation of an aggregated state and the band at 310 to 345 nm corresponds to the non-aggregated state. The deprotonation of carboxyl groups of GQDs in alkaline solution increases the electrostatic repulsions between them, overcoming the trend of aggregation through layer-layer stacking. The aggregation in acid/neutral solution, however, reduces the band gap and consequently a red-shift excitation is observed.

The corresponding Jablonski diagram based on the contour map is depicted in FIG. 14B. A 0.66 eV difference in absorption is observed between the non-aggregated and aggregated states, which leads to different emission energy gaps. A photon screening effect is also seen in the contour maps showing that the emission wavelength of b-GQDs is excitation-independent. At the same pH environment, no apparent PL emission peak shift is observed when b-GQDs are excited from 300 to 400 nm, which is different from other reported GQDs. Without being bound by theory, this is thought to be due to the more uniform size of the synthesized b-GQDs.

The PL intensity of GQDs decreased while the quantum yield (QY) increased as the solution was gradually diluted with DI water from a concentration of 3 mg/mL while keeping the pH constant at 6 (FIG. 14C). A slight blue shift of the PL intensity maximum was observed when the solutions were diluted, attributed to the lower aggregation of GQDs within the diluted solutions, thus affording higher band gaps. The relative QYs of different concentrations are summarized in FIG. 14D. The lower QY at higher GQDs concentration may be attributed to the aggregation quenching effect from stacking of polyaromatic structures.

Figure 15:
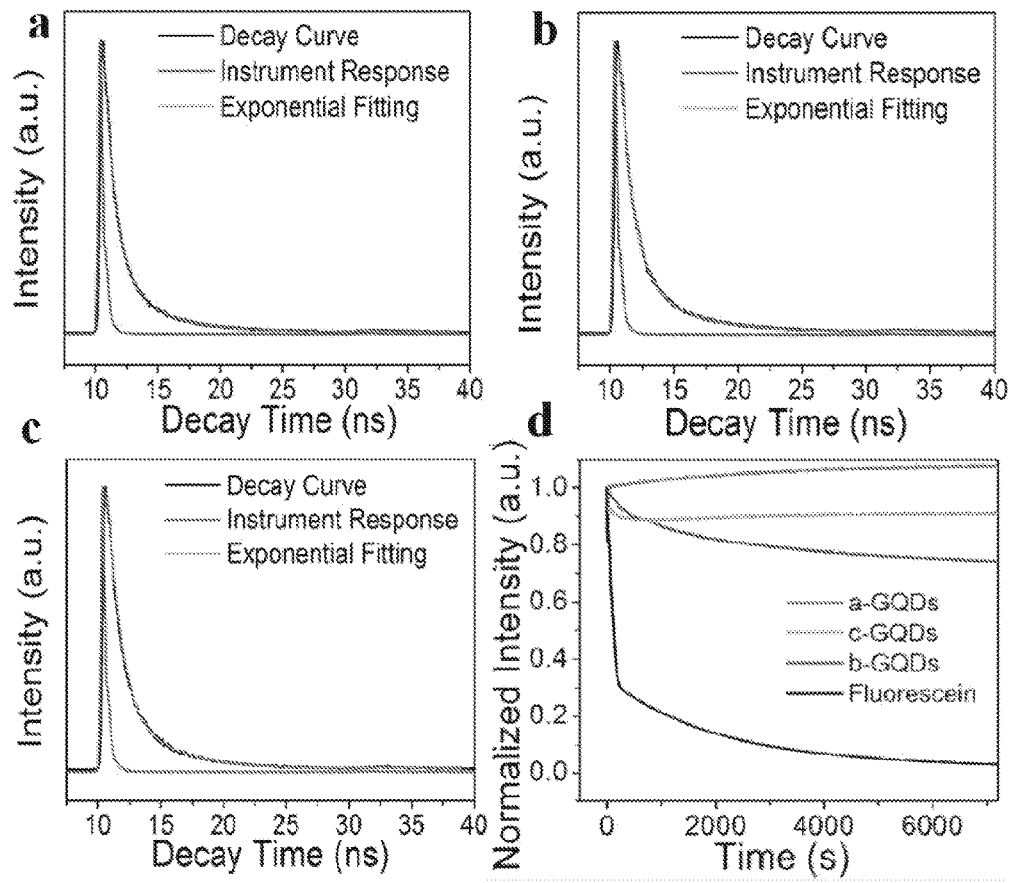
FIG. 15 provides time-resolved photoluminescence decay profiles of b-GQDs at pH 3 (FIG. 15A), pH 7 (FIG. 15B), and pH 11 (FIG. 15C).

The time-resolved photoluminescence decay profiles of b-GQD at pH 3, 7 and 11 are shown in FIGS. 15A-C. The corresponding lifetimes, calculated by fitting to exponential functions using iterative reconvolution, are summarized in Table 6.

TABLE 6

Lifetime calculations from the time-resolved decay profiles of b-GQDs.

| pH | $\tau_1$ (ns) | Percentage (%) | $\tau_2$ (ns) | Percentage (%) | $\tau_3$ (ns) | Percentage (%) | Ave. $\tau$ (ns) |
|---|---|---|---|---|---|---|---|
| 3 | 0.26 ± 0.02 | 18 | 1.01 ± 0.03 | 40 | 3.83 ± 0.05 | 42 | 2.06 |
| 7 | 0.49 ± 0.05 | 22 | 1.31 ± 0.08 | 38 | 4.54 ± 0.09 | 40 | 2.42 |
| 11 | | | 0.89 ± 0.01 | 51 | 3.75 ± 0.04 | 49 | 2.29 |

The observed $\tau_1$ (<0.5 ns) at pH 3 and 7 is thought to be due to the photoluminescence decay of the aggregated state, which is not present in alkaline solution. For pH 7, the lifetime of $\tau_3$ (>3 ns) is longer, which accounts for the higher PL emission at neutral pH as shown in FIG. 13B. The photostability of the GQDs was tested and is shown in FIG. 15D. No rapid photobleaching was observed from any of the three GQDs within 2 h. This is far more stable than in the comparison experiment using fluorescein.

In sum, Applicants have developed a facile approach to prepare different nanometer-sized graphene quantum dots from various coals and coke and established that the unique structure of coal is advantageous for making GQDs. The specific methodologies used are summarized herein.

Example 1.1. Fabrication of GQDs from Coal and Coke

In a typical procedure, 300 mg of coal or coke was suspended in concentrated sulfuric acid (60 mL) and nitric acid (20 mL). This was followed by cup sonication (Cole Parmer, model 08849-00) for 2 h. The reaction was then stirred and heated in an oil bath at 100° C. or 120° C. for 24 h. Next, the solution was cooled to room temperature and poured into a beaker containing 100 mL ice, followed by adding NaOH until the pH was 7. The neutral mixture was then filtered through a 0.45 μm polytetrafluoroethylene (PTFE) membrane and the filtrate was dialyzed in 1000-Da dialysis bag for 5 d.

In a scale-up procedure, 30 g of coal (e.g., anthracite) or coke was first suspended in 600 mL of concentrated sulfuric acid. The reaction was then stirred and 200 mL of nitric acid was slowly added into the solution in 10 portions. Each portion was added in every other 10 min (explosion can happen if more nitric acid is added for each time). The mixture was then stirred and heated in an oil bath at 120° C. for 48 h. The solution was cooled to room temperature and poured into a beaker containing 2 L ice, followed by adding NaOH until the pH was 7. The beaker was in a bucket full of ice while adding NaOH to balance the generated heat. The neutral mixture was then filtered through a filter paper (Cat. No. 1002150) and the filtrate was purified using a tangential flow filtration system (Krosflo Research Iii, molecular weight cutoff is 3 kD) for 5 days. After purification, the solution was concentrated using rotary evaporation to obtain solid GQDs.

Example 1.2. Materials

Anthracite (Fisher Scientific, Cat. No. S98806), bituminous coal (Fisher Scientific, Cat. No. S98809), coke (M-I SWACO, Product Name: C-SEAL), graphite (Sigma-Aldrich, Cat. No. 332461, ca. 150 μm flakes), $H_2SO_4$ (95%-98%, Sigma-Aldrich), $HNO_3$ (70%, Sigma-Aldrich), $H_3PO_4$ (≥85%, Sigma-Aldrich), and $KMnO_4$ (Sigma-Aldrich) were used as received unless otherwise noted. Polytetrafluoroethylene (PTFE) membranes (Sartorius, Lot No. 11806-47-N) and dialysis bags (Membrane Filtration Products, Inc. Product No. 1-0150-45) were used to purify the graphene quantum dots (GQDs). Mica discs (product #50) were purchased from Ted Pella, Inc.

Example 1.3. Sample Characterizations

Scanning electron microscopy (SEM) was performed on a FEI Quanta 400 high resolution field emission SEM, 5 nm Au was sputtered (Denton Desk V Sputter system) on the coal or coke surface before imaging. The high-resolution transmission electron microscope (TEM) images were taken using a 2100F field emission gun TEM with GQDs directly transferred onto a C-flat TEM grid. The atomic force microscope (AFM) image was obtained on a Digital Instrument Nanoscope IIIA AFM. The GQDs aqueous solution was spin-coated (3000 rpm) on a freshly cleaved mica substrate and dried at room temperature before imaging. X-ray photoelectron spectroscopy (XPS) spectra were measured on a PHI Quantera SXM scanning X-ray microprobe with 45° takeoff angle and 100 μm beam size. The pass energy for surveys was 140 eV and 26 eV for high resolution scans. Raman microscopy was performed with Renishaw Raman microscope using 514-nm laser excitation at room temperature. UV-Visible spectra were recorded on a Shimadzu UV-2450 UV-Vis spectrophotometer. Steady state photoluminescence spectra were obtained in a HORIBA JovinYvon Fluorolog 3, with excitation at 370 nm. Time-resolved studies was performed using an Edinburgh Instruments OD470 single-photon counting spectrometer with a high speed red detector, and using a 370 nm picosecond pulse diode laser.

Example 1.4. Relative Quantum Yield Calculation

The quantum yields of the graphene quantum dots were calculated with the following formula:

$$\Phi_i = \frac{I_i}{I_r} \frac{1 - 10^{-A_r}}{1 - 10^{-A_i}} \frac{n_i^2}{n_r^2} \Phi_r$$

In this formula, $\Phi_r=1$ is the normalized quantum yield of reference. In this work, 0.125 mg/mL b-GQDs aqueous solution was used as the reference. $\Phi_i$ is the relative quantum yield with respect to the reference. The integrated intensities (area) of sample and reference are $I_i$ and $I_r$, respectively. $A_i$ and $A_r$ are the absorbance. $n_i$ and $n_r$ are the refractive indices of the samples and reference solution, respectively.

Example 1.4. Energy Gap Calculation

The energy gaps of the graphene quantum dots were calculated with the following formula:

$E=hc/\lambda$

In this formula, h is the Planck constant, c is the speed of light, and $\lambda$ is the wavelength of absorption or emission.

Example 2. Preparation of Graphene Quantum Dots from Anthracite (a-GQDs)

In this Example, graphene quantum dots were prepared from anthracite. 30 g of anthracite (Fisher Scientific, Cat. No. S98806) was suspended in 600 mL of concentrated sulfuric acid (95-98%, Sigma Aldrich). The reaction was then mechanically stirred. Next, 200 mL of nitric acid (70%, Sigma Aldrich) was slowly added into the slurry in 10 portions over 100 min (caution: the rate of nitric acid addition to sulfuric acid should be controlled to minimize uncontrollable exothermic events). The mixture was then mechanically stirred and heated in an oil bath at 120° C. for 48 h. The solution was cooled to room temperature and slowly poured into a beaker containing 2 L of crushed ice. The beaker was then placed in a bucket of ice for cooling, followed by adding NaOH solid until the pH was 7. The neutralized mixture was then filtered through filter paper (Cat. No. 1002150) and the filtrate was purified using tangential flow filtration system (Krosflo Research Iii, molecular weight cutoff is 3 kD) for 5 days. After purification, the solution was concentrated using rotary evaporation (50° C. under vacuum) to obtain 5.3 g of solid a-GQDs.

Figure 16:
FIG. 16 shows a photo of 5 g of graphene quantum dots produced from anthracite (a-GQDs) in a glass vial. The total yield of graphene quantum dots produced from the oxidation of 30 g of anthracite with sulfuric acid and nitric acid was 5.3 g.
Figure 17:
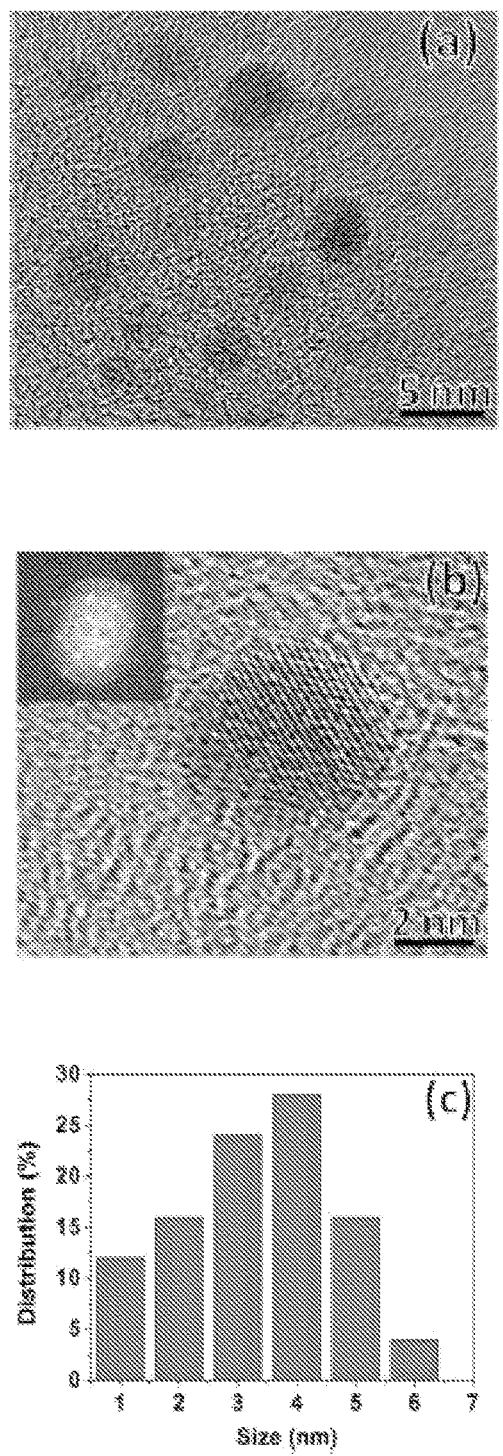
FIG. 17 shows additional data relating to the characterization of a-GQDs.
Figure 18:
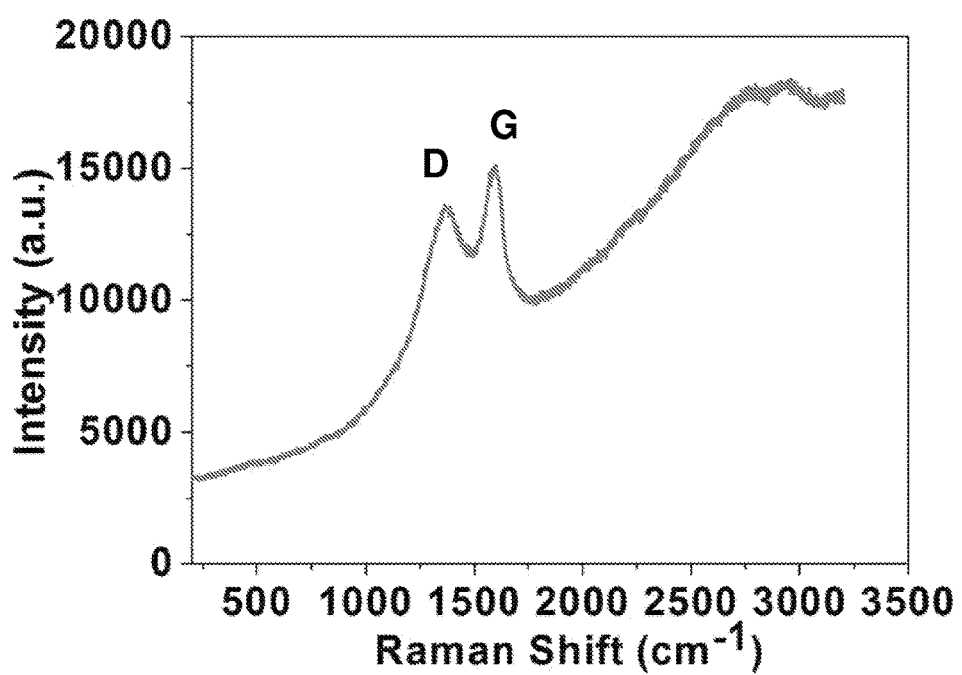
FIG. 18 shows the spectrum of a-GQDs with 514 nm laser excitation. G and D Raman peaks of a typical oxidized graphitic structure were observed.
Figure 19:
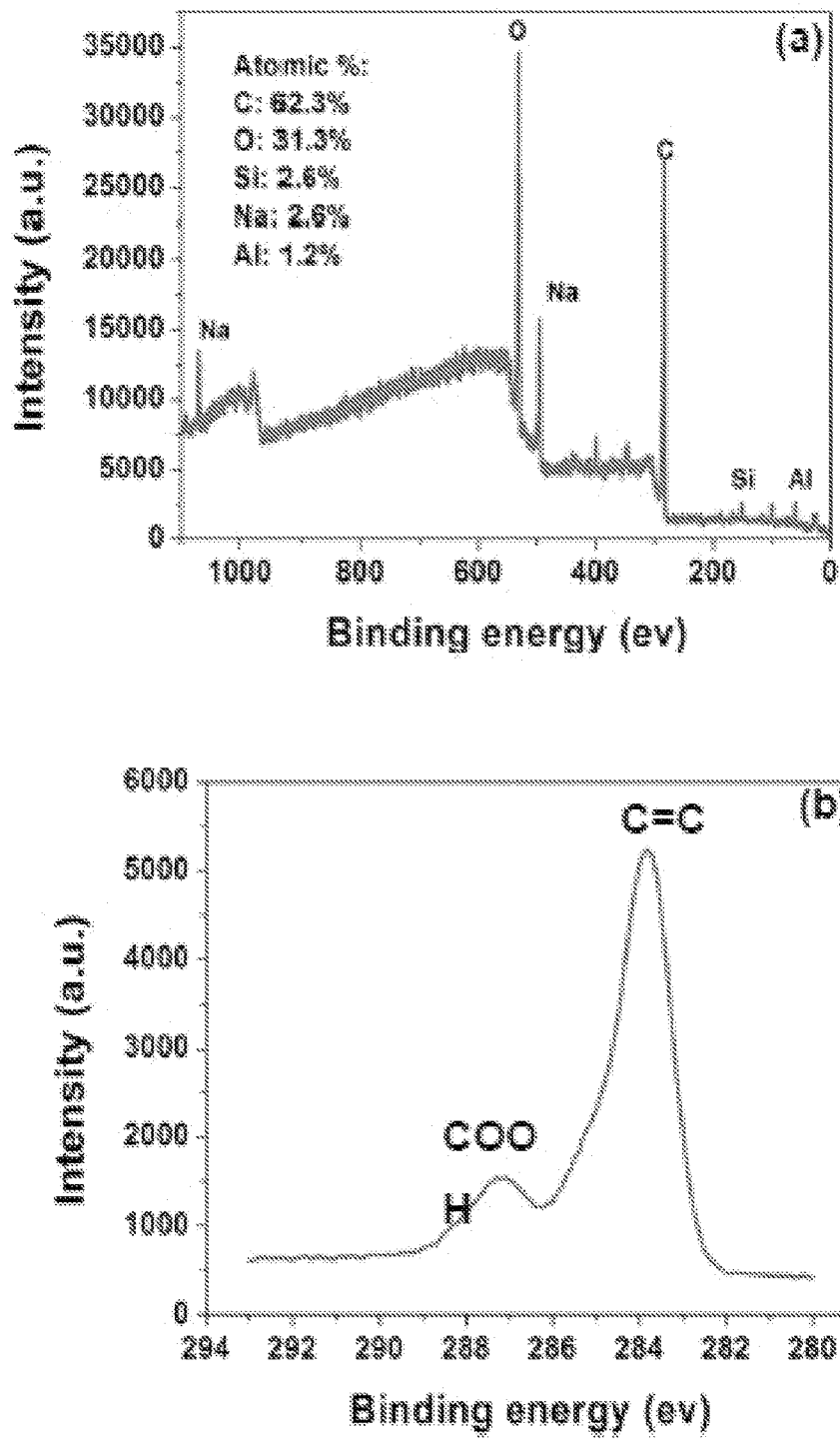
FIG. 19 shows XPS spectra of a-GQDs.
Figure 20:
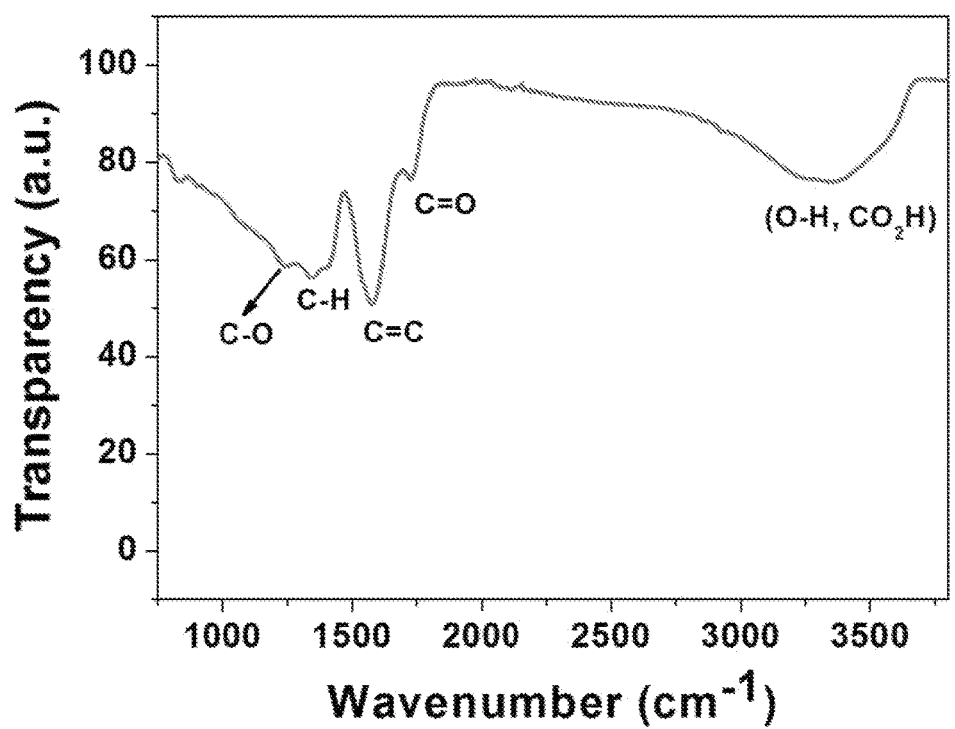
FIG. 20 shows the FTIR spectrum of a-GQDs.
Figure 21:
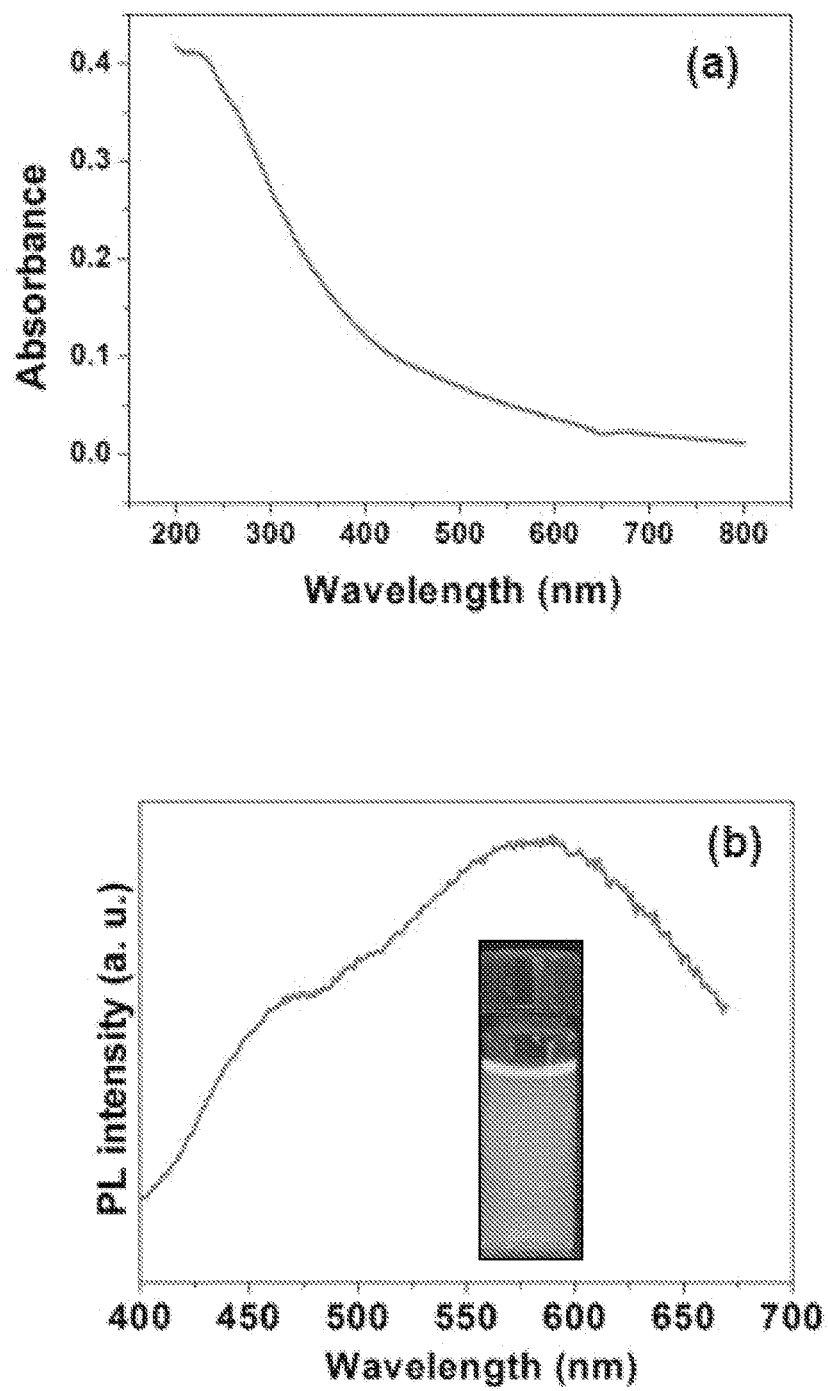
FIG. 21 provides data relating to the photophysical characterizations of a-GQDs.

FIGS. 16-21 provide data relating to the characterization of the formed a-GQDs on the 5 g scale (i.e., a yield of 5.3 g). In particular, FIG. 16 shows a photo of the produced a-GQDs. TEM images in FIGS. 17B-C show that the produced a-GQDs have a graphitic structure. In addition, the size distribution in FIG. 17C shows that the a-GQDs have sizes that range from about 1 nm to about 6 nm. Likewise, the Raman, XPS and FTIR spectra in FIGS. 18-20 show that the produced GQDs are oxidized. In addition, the photophysical characterizations in FIG. 21 show that the produced a-GQDs are fluorescent.

Example 3. Improving the Quantum Yield of Coal-Derived Graphene Quantum Dots

In this Example, Applicants improved the quantum yield of coal-derived graphene quantum dots (GQDs) by hydrothermal treatment.

Graphene quantum dots were synthesized by sonicating 3.0 g of anthracite in 60 mL of 95% sulfuric acid and 20 mL of 70% nitric acid. Next, the solution was heated to 80° C. for one day. Thereafter, the as-prepared GQDs were sonicated in 0.2 M NaOH for 2 h. Next, the GQDs were hydrothermally treated in Teflon-sealed autoclave for 10 h at 200° C. After that, the solution was dialyzed for 1 day. The resulting pH is 7 after dialysis.

Figure 22:
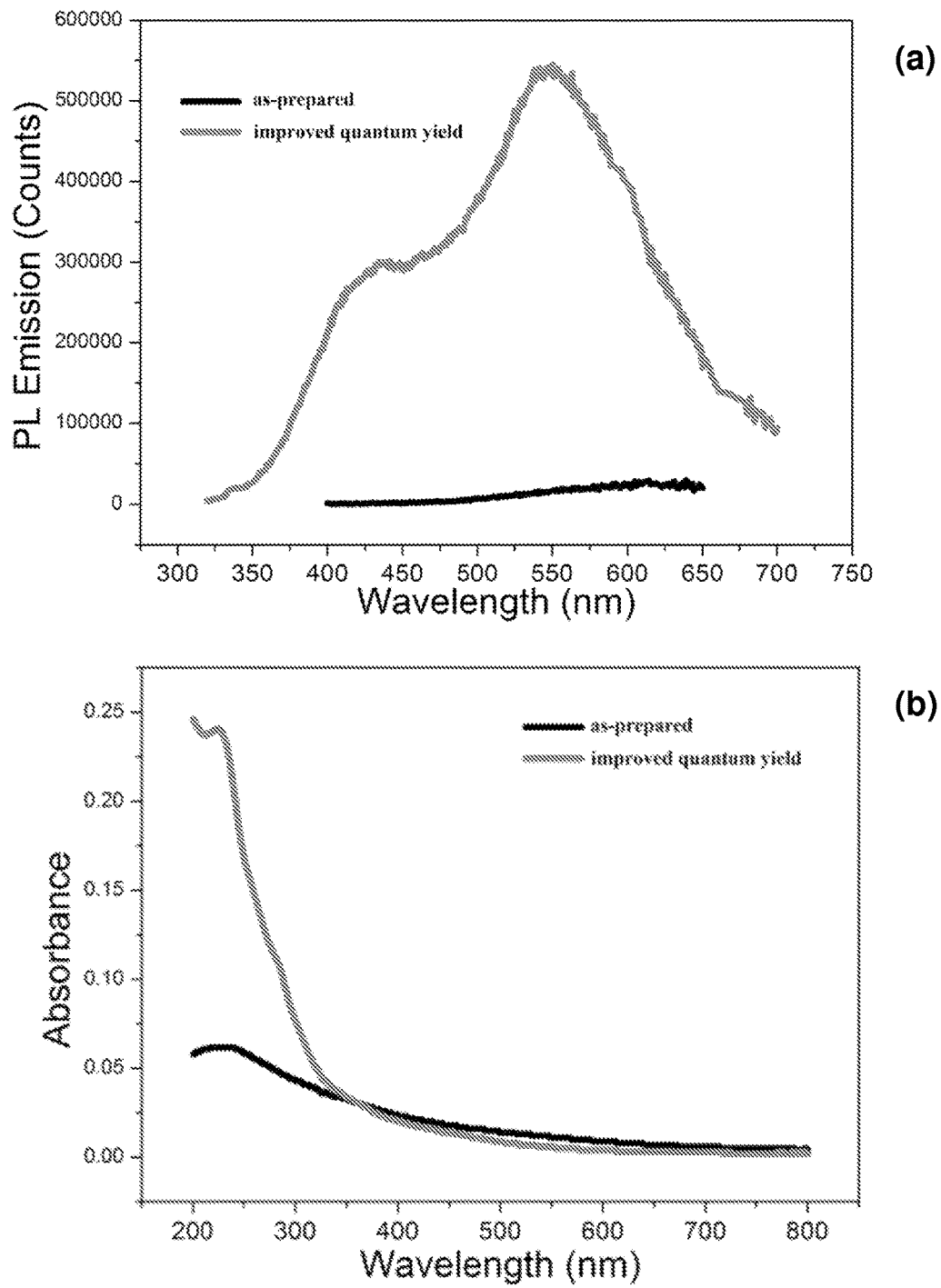
FIG. 22 provides PL emission (FIG. 22A) and absorbance spectra (FIG. 22B) of graphene quantum dots before and after hydrothermal treatment. The spectra show that hydrothermal treatment increased the quantum yield of graphene quantum dots.

The spectra in FIG. 22 and the comparative chart in Table 7 show that the quantum yield of GQDs improved significantly after hydrothermal treatment.

TABLE 7

Comparison of GQDs Quantum Yield after Hydrothermal Treatment.

| Samples | QY at 300 nm | | QY at 345 nm | |
| --- | --- | --- | --- | --- |
| | $QY^a$ | $QY^b$ | $QY^a$ | $QY^b$ |
| As-prepared | 0.267 | 0.188 | 0.274 | 0.193 |
| Improved QY | 5.33 | 3.77 | 4.73 | 3.34 |

[a]Rhodamine B;
[b]Fluorescein

In this Example, Applicants improved the quantum yield of coal-derived graphene quantum dots (GQDs) by hydrothermal treatment. Hydrothermal treatment of nanoparticles in concentrated NaOH solution has been shown to be an effective approach to remove the surface impurities of nanoparticles. *Chem. Mater.* 21, 3917-3923 (2009). As shown in the PL emission in FIG. 22A, the PL intensity of GQDs increased dramatically after the hydrothermal treatment. In addition, as summarized in Table 7, the quantum yield (QY) after hydrothermal treatment increased 20 times. Such observations were similar to the quantum yield of PEGylated GQDs made from graphite (6%).

Without being bound by theory, it is envisioned that the improved quantum yield is attributed to the removal of surface impurities, which increases the non-radiative relaxation of GQDs. However, the removal process can also be due to the hydrothermal treatment, including treatment with aqueous NaOH.

Carbon-nanoparticles with hetero-element doping have also been shown to increase the QY. Kang et al., *J. Mater. Chem. A.* (2014) (DOI: 10.1039/C4TA00860J). The doping process can be achieved by hydrothermally treating the GQDs with NaHS, NaHSe or NaH$_2$PO$_3$, which act as reducing dopants. By using the hydrazine reduction reaction (*Carbon* 49, 3019-3023 (2011)), the GQDs can also be doped with nitrogen. These approaches can increase the QYs through introduction of heteroatoms.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of making graphene quantum dots from a carbon source, wherein the method comprises:
   exposing the carbon source to an oxidant, wherein the carbon source is selected from the group consisting of coal, coke and combinations thereof, wherein the exposing comprises stirring and heating the carbon source in the presence of the oxidant, and wherein the exposing provides oxidative reaction conditions sufficient to result in formation of the graphene quantum dots from the carbon source.

2. The method of claim 1, wherein the carbon source comprises coal, wherein the coal is selected from the group consisting of anthracite, bituminous coal, sub-bituminous coal, metamorphically altered bituminous coal, asphaltenes, asphalt, peat, lignite, steam coal, petrified oil, and combinations thereof.

3. The method of claim 1, wherein the carbon source comprises coke.

4. The method of claim 1, wherein the carbon source comprises bituminous coal.

5. The method of claim 1, wherein the carbon source comprises anthracite.

6. The method of claim 1, wherein the oxidant comprises an acid.

7. The method of claim 6, wherein the acid is selected from the group consisting of sulfuric acid, nitric acid, phosphoric acid, hypophosphorous acid, fuming sulfuric acid, hydrochloric acid, oleum, chloro sulfonic acid, and combinations thereof.

8. The method of claim 1, wherein the oxidant is a mixture of sulfuric acid and nitric acid.

9. The method of claim 1, wherein the oxidant is selected from the group consisting of potassium permanganate, sodium permanganate, hypophosphorous acid, nitric acid, sulfuric acid, hydrogen peroxide, and combinations thereof.

10. The method of claim 1, wherein the oxidant is a mixture of potassium permanganate, sulfuric acid, and hypophosphorous acid.

11. The method of claim 1, wherein the exposing comprises sonicating the carbon source in presence of the oxidant.

12. The method of claim 1, wherein the heating occurs at temperatures of at least about 100° C.

13. The method of claim 1, wherein the heating occurs at temperatures ranging from about 100° C. to about 150° C.

14. The method of claim 1, further comprising a step of separating the formed graphene quantum dots from the oxidant.

15. The method of claim 14, wherein the separating comprises:
neutralizing a solution comprising the formed graphene quantum dots,
filtering the solution, and
dialyzing the solution.

16. The method of claim 1, further comprising a step of enhancing a quantum yield of the graphene quantum dots.

17. The method of claim 16, wherein the enhancing occurs by hydro thermal treatment of the graphene quantum dots, treatment of the graphene quantum dots with one or more bases, treatment of the graphene quantum dots with one or more hydroxides, treatment of the graphene quantum dots with one or more dopants, and combinations thereof.

18. The method of claim 16, wherein the enhancing occurs by hydro thermal treatment of the graphene quantum dots.

19. The method of claim 1, further comprising a step of reducing the formed graphene quantum dots.

20. The method of claim 19, wherein the reducing comprises exposure of the formed graphene quantum dots to a reducing agent.

21. The method of claim 19, wherein the reducing agent is selected from the group consisting of hydrazine, sodium borohydride, heat, light, sulfur, sodium sulfide, sodium hydrogen sulfide, and combinations thereof.

22. The method of claim 1, wherein the formed graphene quantum dots have diameters ranging from about 1 nm to about 50 nm.

23. The method of claim 1, wherein the carbon source is bituminous coal, and wherein the formed graphene quantum dots have diameters ranging from about 1 nm to about 5 nm.

24. The method of claim 1, wherein the carbon source is anthracite, and wherein the formed graphene quantum dots have diameters ranging from about 10 nm to about 50 nm.

25. The method of claim 1, wherein the carbon source is coke, and wherein the formed graphene quantum dots have diameters ranging from about 2 nm to about 10 nm.

26. The method of claim 1, further comprising a step of controlling the diameter of the formed graphene quantum dots.

27. The method of claim 26, wherein the controlling comprises selecting the carbon source.

28. The method of claim 27, wherein the selected carbon source is bituminous coal, and wherein the formed graphene quantum dots have diameters ranging from about 1 nm to about 5 nm.

29. The method of claim 27, wherein the selected carbon source is anthracite, and wherein the formed graphene quantum dots have diameters ranging from about 30 nm to about 50 nm.

30. The method of claim 27, wherein the selected carbon source is coke, and wherein the formed graphene quantum dots have diameters ranging from about 2 nm to about 10 nm.

31. The method of claim 1, wherein the formed graphene quantum dots have a crystalline hexagonal structure.

32. The method of claim 1, wherein the formed graphene quantum dots have a single layer.

33. The method of claim 1, wherein the formed graphene quantum dots have multiple layers.

34. The method of claim 33, wherein the formed graphene quantum dots have from about two layers to about four layers.

35. The method of claim 1, wherein the formed graphene quantum dots are functionalized with a plurality of functional groups.

36. The method of claim 35, wherein the functional groups are selected from the group consisting of amorphous carbon, oxygen groups, carbonyl groups, carboxyl groups, esters, amines, amides, and combinations thereof.

37. The method of claim 35, wherein the formed graphene quantum dots are edge functionalized with a plurality of functional groups.

38. The method of claim 37, wherein the formed graphene quantum dots comprise oxygen addends on their edges.

39. The method of claim 37, wherein the formed graphene quantum dots comprise amorphous carbon addends on their edges.

40. The method of claim 1, wherein the formed graphene quantum dots are utilized in road stickers, road signs, coatings, clothing, paints, photographic processing materials, and combinations thereof.

* * * * *